(12) United States Patent
Kitani et al.

(10) Patent No.: US 7,346,670 B2
(45) Date of Patent: Mar. 18, 2008

(54) SECURE STORAGE SYSTEM

(75) Inventors: Makoto Kitani, Kokubunji (JP);
Kazuyoshi Hoshino, Komae (JP);
Morihito Miyagi, Yokohama (JP);
Shinichi Akahane, Hachioji (JP);
Masahiko Mizutani, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 355 days.

(21) Appl. No.: 10/351,382

(22) Filed: Jan. 27, 2003

(65) Prior Publication Data

US 2003/0229690 A1 Dec. 11, 2003

(30) Foreign Application Priority Data

Jun. 11, 2002 (JP) ............................ P2002-169725

(51) Int. Cl.
*G06F 15/16* (2006.01)
*G06F 15/177* (2006.01)
*G06F 7/00* (2006.01)

(52) U.S. Cl. .................... 709/219; 709/223; 707/10
(58) Field of Classification Search ............... 709/223, 709/225, 232; 711/147, 152, 153; 707/2, 707/10, 200, 202
See application file for complete search history.

(56) References Cited

U.S. PATENT DOCUMENTS

| | | | | |
|---|---|---|---|---|
| 5,941,972 | A * | 8/1999 | Hoese et al. ................. | 710/315 |
| 6,615,357 | B1 * | 9/2003 | Boden et al. .................. | 726/15 |
| 6,622,220 | B2 * | 9/2003 | Yoshida et al. .............. | 711/152 |
| 6,636,516 | B1 * | 10/2003 | Yamano ................. | 370/395.52 |
| 6,684,209 | B1 | 1/2004 | Ito et al. | |
| 6,732,104 | B1 * | 5/2004 | Weber .......................... | 707/10 |
| 6,826,580 | B2 * | 11/2004 | Harris et al. ................ | 707/202 |
| 6,832,322 | B1 * | 12/2004 | Boden et al. .................. | 726/15 |
| 6,876,656 | B2 * | 4/2005 | Brewer et al. .............. | 370/392 |
| 6,981,140 | B1 * | 12/2005 | Choo .......................... | 713/164 |
| 7,006,526 | B1 * | 2/2006 | Biederman .................. | 370/466 |

(Continued)

FOREIGN PATENT DOCUMENTS

WO WO 02/37225 A2 5/2002

OTHER PUBLICATIONS

B. Fox et al., "Virtual Private Networks Identifier", Network Working Group, Standards Track, Sep. 1999, pp. 1-4.

(Continued)

*Primary Examiner*—John Follansbee
*Assistant Examiner*—J. Bret Dennison
(74) *Attorney, Agent, or Firm*—Reed Smith LLP; Stanley P. Fisher, Esq.; Juan Carlos A. Marquez, Esq.

(57) ABSTRACT

A secure storage system for securely accessing a storage device on a network and improving volume management scalability, consisting of a client having a VPN capability; a storage device in an SAN; a management apparatus having a means for managing a storage capacity and a logical volume allocated to the storage device; a converter for converting a protocol used in the SAN to a protocol used in a LAN/MAN/WAN and vice versa; and a conversion apparatus having the VPN capability. A VPN is provided between the client and the conversion apparatus. The conversion apparatus is provided with a mapping between the VPN and an access range of the storage device. A VPN-ID is used for identifying the VPN. An address in the logical volume is used for the access range of the storage device.

20 Claims, 27 Drawing Sheets

U.S. PATENT DOCUMENTS

| | | | |
|---|---|---|---|
| 7,085,827 B2* | 8/2006 | Ishizaki et al. | 709/223 |
| 7,099,912 B2* | 8/2006 | Ishizaki et al. | 709/201 |
| 7,124,189 B2* | 10/2006 | Summers et al. | 709/227 |
| 7,171,453 B2* | 1/2007 | Iwami | 709/218 |
| 7,275,050 B2* | 9/2007 | Fujimoto | 707/1 |
| 2001/0034758 A1 | 10/2001 | Kikinis | |
| 2002/0010790 A1 | 1/2002 | Ellis et al. | |
| 2002/0069369 A1 | 6/2002 | Tremain | |
| 2002/0131364 A1* | 9/2002 | Virtanen et al. | 370/230 |
| 2002/0156867 A1* | 10/2002 | Iwami | 709/218 |
| 2002/0161855 A1* | 10/2002 | Manczak et al. | 709/219 |
| 2003/0002494 A1* | 1/2003 | Kuukankorpi et al. | 370/386 |
| 2003/0041136 A1* | 2/2003 | Cheline et al. | 709/223 |
| 2003/0074599 A1* | 4/2003 | Golasky et al. | 714/6 |
| 2003/0105830 A1 | 6/2003 | Pham et al. | |
| 2003/0120743 A1 | 6/2003 | Coatney et al. | |
| 2003/0135578 A1* | 7/2003 | Banga et al. | 709/215 |
| 2003/0145045 A1 | 7/2003 | Pellegrino et al. | |
| 2003/0182363 A1* | 9/2003 | Clough et al. | 709/203 |
| 2003/0217132 A1* | 11/2003 | Batten et al. | 709/223 |
| 2004/0233910 A1* | 11/2004 | Chen et al. | 370/395.5 |
| 2004/0255048 A1* | 12/2004 | Lev Ran et al. | 709/249 |
| 2005/0088977 A1* | 4/2005 | Roch et al. | 370/254 |
| 2007/0174428 A1* | 7/2007 | Lev Ran et al. | 709/218 |

OTHER PUBLICATIONS

"New Storage Connectivity Options that Extend the I/O Channel", Chapter 1: Getting a Handle on Storage Networking, pp. 23-30.

Building Storage Networks, Second Edition, "Chapter 1: Getting a Handle on Storafe Networking", "New Storage Connectivity Options that Extent the I/O Channel", pp. 23-30, Jan. 27, 2003.

Julian Satran, Kalman Meth, Costa Sapuntzakis, Mallikarjun Chadalapaka and Efri Zeidner, IP Storage Working Group, Internet Draft, Nov. 2002, pp. 1-2, 129-140, 159-164, 179-190.

B. Fox, B. Gleeson, "Virtual Private Networks Identifier", Network Working Group Sep. 1999, pp. 1-4.

S. Kent and R. Atkinson, "Security Architecture for the Internet Protocol", Network Working Group, Nov. 1998, pp. 1, 4-8.

P. Mockapetris, "Domain Names—Concepts and Facilities" and "Domain Names—Implementation and Specification" Network working Group, Nov. 1987, pp. 1-3, 1-7.

"Virtual Bridged Local Area Networks", IEEE Standards for Local and Metropolitan Area Networks (1999), pp. 1-2, 11-12.

K. Nichols, S. Blake, F. Baker, and D. Black, "Definition of the Differentiated Services Field (DS Field) in the IPv4 and IPv6 Headers", Network Working Group, Standards Track, Dec. 1998, pp. 1, 7-9.

S. Blake, D. Black, W. Carlson, E. Davis, Z. Wang and W. Weiss, "An Architecture for Differentiated Services", Network Working Group, Dec. 1998, pp. 1, 12-17.

Lou Berger., "Generalized MPLS-Signaling Functional Description", Network Working Group, Internet Draft, Aug. 2002, pp. 1, 4-6.

E. Rosen, A. Viswanathan and R. Callon, Multiprotocol Label Switching Architecture, Network Working Group, Standards Track, Jan. 2001, pp. 1, 4-6.

D. Durham, J. Boyle, R. Cohen, S. Herzog, R. Rajan and A. Sastry, The COPS (Common Open Policy Service) Protocol, Network Working Group Standards Track, Jan. 2000, pp. 1, 4-7.

K. Chan, J. Seligson, D. Durham, S. Gai, K. McCloghrie, S. Herzog, F. Reichmeyer, R. Yavatkar and A. Smith, COPS Usage for Policy Provisioning (COPS-PR), Mar. 2001, Network Working Group, Standards Track, pp. 1-6.

UDDI Technical White Paper, Introduction and Technical Overview, Sep. 6, 2000, 2 sheets.

E. Rosen and Y. Rekhter, BGP/MPLS VPNs, Network Working Group, Mar. 1999, p. 1.

"Enables Enterprise Workgroups to Cost Effectively Migrate from DAS to SANs", Press Release, 3 pages, Jan. 27, 2003.

Tom Clark, Director, Technical Marketing, "Zoning for Fibre Channel Fabrics", Aug. 1999, White Paper, cover page plus pp. 1-6.

* cited by examiner

FIG. 3

| Client-ID | Auth | VPN-ID | Vol-ID(ONE OR MORE) |
|---|---|---|---|
| CLIENT 21 | AUTHENTICATION INFORMATION 33 | VPN-ID31 | VIRTUAL VOLUME 16 |
| CLIENT 22 | | | |

FIG. 4

| TS-ID | ADDRESS | ST-ID (ONE OR MORE) | Vol-ID (ONE OR MORE) | Total-capacity | Free-capacity |
|---|---|---|---|---|---|
| CONVERSION APPARATUS 24 | ADDR24 | STORAGE 26 | VIRTUAL VOLUME 16 | | |
| CONVERSION APPARATUS 25 | ADDR25 | STORAGE 27 | VIRTUAL VOLUME 16 | | |

FIG. 5

| Vol-ID (ONE OR MORE) | Capacity | Range | Client-ID (ONE OR MORE) | TS-ID (ONE OR MORE) |
|---|---|---|---|---|
| VIRTUAL VOLUME 16 | | RANGE1 | CLIENT 21 | CONVERSION APPARATUS 24 |
| | | | | CONVERSION APPARATUS 25 |

F I G. 6

| ST-ID | TS-ID | Condition | Total-capacity | Free-capacity | Virtual Volume Allocation (one or more) | | |
|---|---|---|---|---|---|---|---|
| | | | | | | Offset | Range |
| STORAGE 26 | CONVERSION APPARATUS 24 | NORMAL | | | VIRTUAL VOLUME 16 | OFFSET 2 | RANGE1 |
| STORAGE 27 | CONVERSION APPARATUS 25 | NORMAL | | | VIRTUAL VOLUME 16 | OFFSET 1 | RANGE1 |

F I G. 8
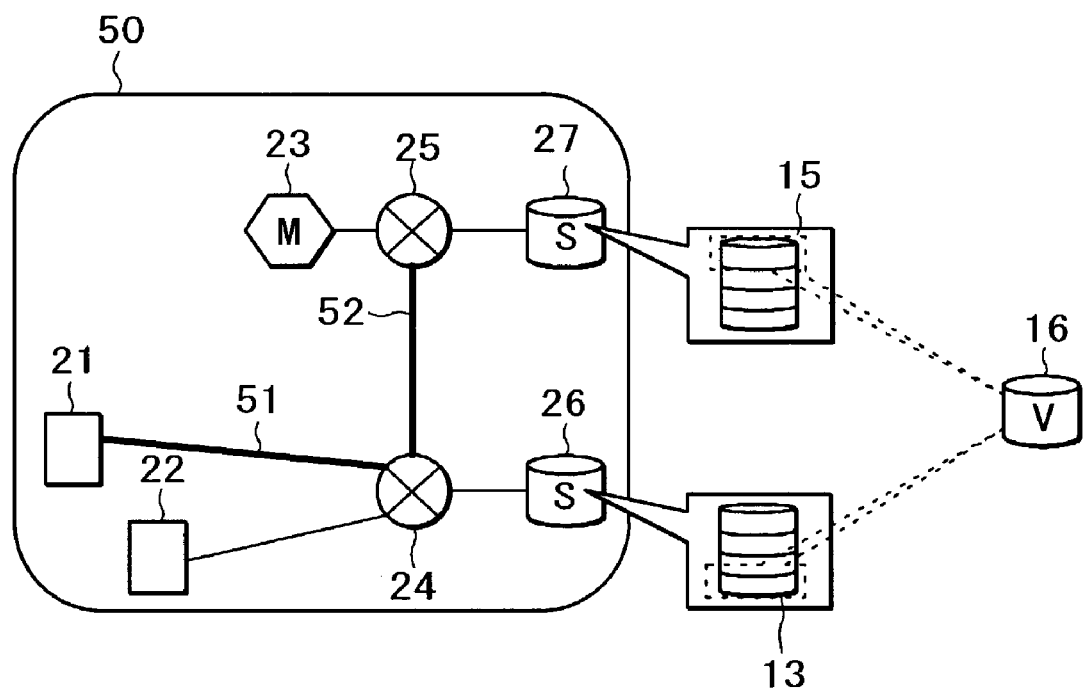

FIG. 9

| | NETWORK INFORMATION | | STORAGE INFORMATION | | BACKUP CONVERSION APPARATUS |
|---|---|---|---|---|---|
| VPN IDENTIFIER | ADDRESS RANGE | | STORAGE IDENTIFICATION | OFFSET | |
| 100000-00000001 | 0-400 | | FC-PORT1 | OFFSET2 | 10.100.1.5 |
| 100000-00000001 | 4000-10000 | | FC-PORT2 | OFFSET1 | 10.100.1.5 |
| 100000-00000065 | <NONE> | | FC-PORT1 | OFFSET1 | <NONE> |
| VPN-ID31 | RANGE1 | | STORAGE 26 | OFFSET1 | ADDR25 |

FIG. 10

| NETWORK INFORMATION | | STORAGE INFORMATION | | BACKUP CONVERSION APPARATUS |
|---|---|---|---|---|
| VPN IDENTIFIER | ADDRESS RANGE | STORAGE IDENTIFICATION | OFFSET | |
| 100000-00000011 | 0-400 | FC-PORT1 | OFFSET1 | 10.100.2.5 |
| 100000-00001065 | 0-10000 | FC-PORT1 | OFFSET2 | 10.100.2.5 |
| VPN-ID31 | RANGE1 | STORAGE 27 | OFFSET2 | <NONE> |
| 41 | 42 | 43 | 44 | 45 |

FIG. 17

| STATE | ACCESS REQUEST | | BACKUP CONVERSION APPARATUS 45 | VPN IDENTIFI-CATION 41 | STORAGE IDENTIFI-CATION 43 | DATA START ADDRESS |
|---|---|---|---|---|---|---|
| | START ADDRESS | DATA LENGTH | | | | |
| COMPLETE | 3000 | 1MB | 10.100.1.5 | 10000-00000001 | FC-PORT1 | OFFSET2 +3000 |
| AFTER WRITING | 7000 | 100KB | 10.100.1.5 | 10000-00000001 | FC-PORT1 | OFFSET1 +7000 |
| BEFORE WRITING | VIRTUAL ADDRESS 87 | SIZE OF DATA 35 | CONVERSION APPARATUS 25 | VPN-ID31 | <NONE> | <NONE> |
| AFTER WRITING | VIRTUAL ADDRESS 87 | SIZE OF DATA 35 | CONVERSION APPARATUS 25 | VPN-ID31 | STORAGE 26 | LOGICAL ADDRESS 89 |

NETWORK SIDE ←⋮→ STORAGE SIDE

F I G. 2 5
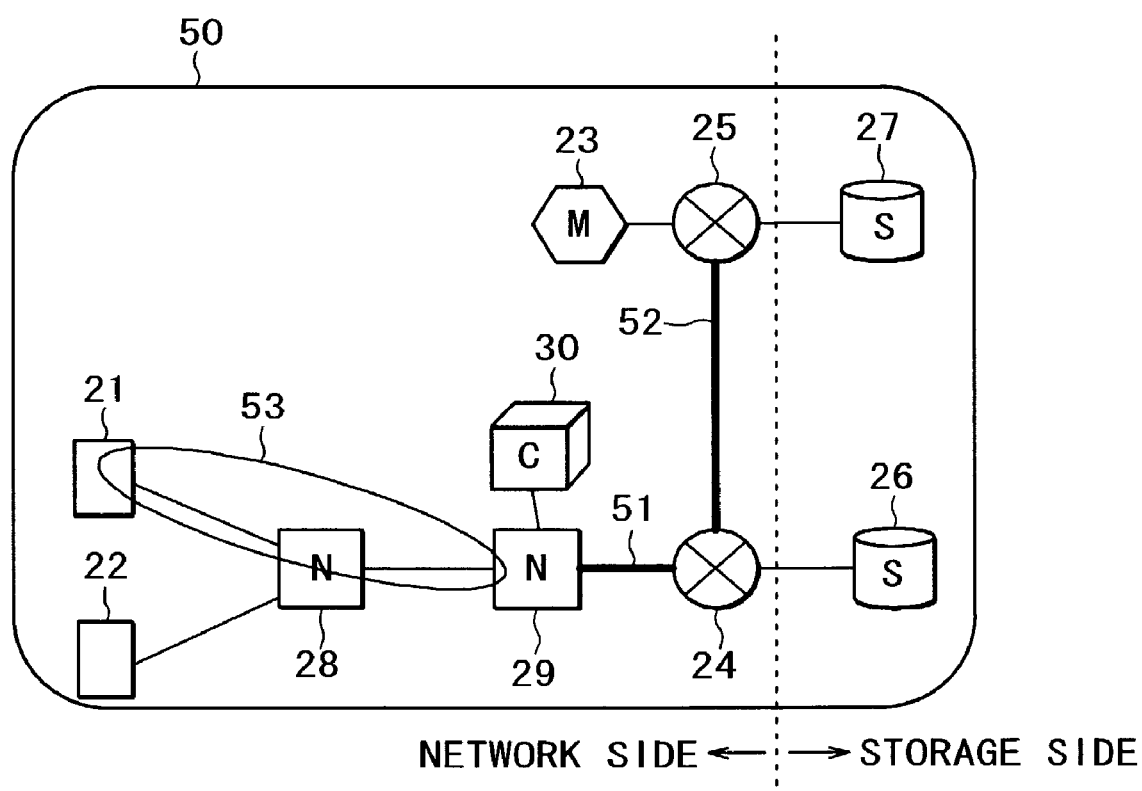

F I G. 2 6
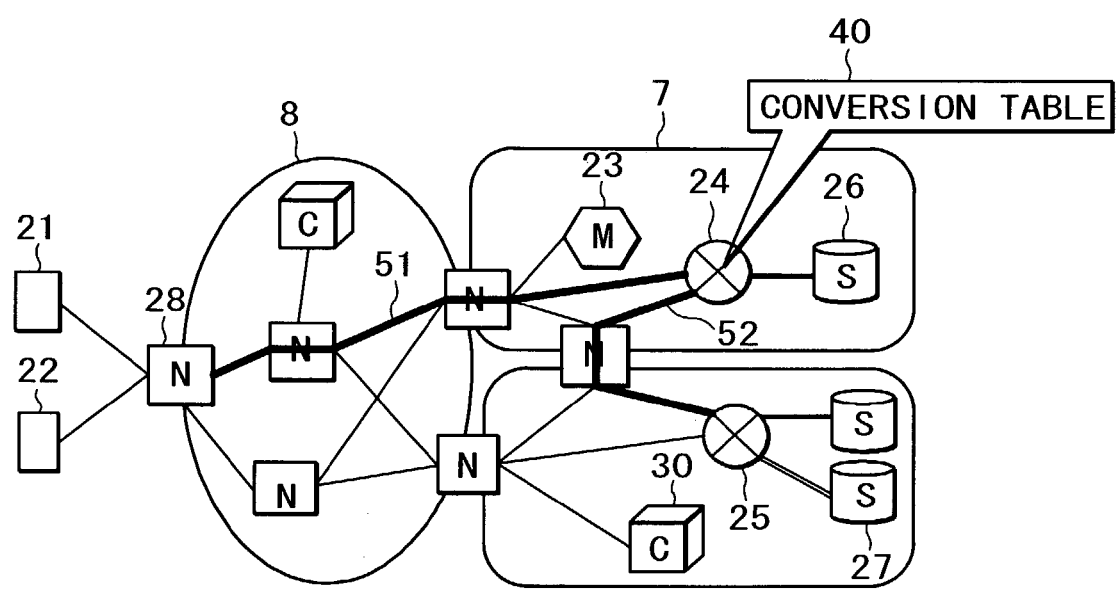

SECURE STORAGE SYSTEM

BACKGROUND OF THE INVENTION

1. Field of the Invention

The present invention relates to a storage system in which a client and a storage device are connected via a network.

2. Description of Related Art

A SAN (Storage Area Network) is known as a storage system in which a client and a storage device are connected via a network. The SAN comprises a SAN fabric that uses an FC (Fiber Channel) protocol for communication. The client uses SCSI (Small Computer Systems Interface) commands to access the storage device. An example of the SAN configuration is described in "Building Storage Networks SECOND EDITION" (ISBN 0-07-213072-5, pp. 23-30) published by OSBORNE, Inc., 2001.

In order to prevent an unauthorized access from a client having no access privilege, the SAN uses a zoning capability as shown in FIG. 27 to map a logical volume 13 in a storage device 11 with an FC port 12. The mapping between the logical volume 13 and the FC port 12 allows access to the logical volume 13 only for the client 21 that is permitted to connect with the FC port 12. A client 22 not connected to the FC port 12 cannot access the logical volume 13.

As networks, there are known a LAN (Local Area Network) a MAN (Metropolitan Area Network), and a WAN (Wide Area Network). For these networks, there are widely used network protocols such as Ethernet, ATM (Asynchronous Transfer Mode), and IP (Internet Protocol) all of which are registered trademarks. The iSCSI protocol is known as an access to a storage device connected to the LAN/MAN/WAN directly or via the SAN. The iSCSI protocol interchanges SCSI commands on a network protocol and enables an access to the storage in units of blocks. The detail of the iSCSI protocol is described in "iSCSI" (draft-ietf-ips-iscsi) published by IETF.

To prevent an unauthorized access, the iSCSI specifies protocols concerning login authentication, but no protocols concerning data protection on LAN/MAN/WAN communication paths. A LAN/MAN/WAN requires security countermeasures against an unauthorized access or wire tapping because an unspecified number of clients can connect with the network. A VPN (Virtual Private Network) is known as a countermeasure to prevent unauthorized access or wire tapping.

The VPN technology provides a network protocol constituting a private network used in the LAN for the payload portion of another network protocol used in the LAN/MAN/WAN. The VPN thus virtually forms one private network's area between private networks in remote locations. When the VPN is provided for the LAN/MAN/WAN, traffic of the relevant VPN can be distinguished from the other traffic. As a result, it is possible to prevent unauthorized access or wire tapping from terminals other than those on the VPN and ensure security. There are different types of VPNs for network protocols. Different types of VPNs maintain no connectivity. When different domains manage the same types of VPNs, a connection becomes difficult. For this reason, it is proposed to use a unified identifier, i.e., a VPN-ID. VPN-IDs are described in detail in "Virtual Private Networks Identifier" (RFC2685) published by IETF.

iSCSI uses IPsec as an example of the system for protecting data on LAN/MAN/WAN communication paths. IPsec is specified so as to separate the authentication or encryption algorithm or the key management mechanism from the protocol itself and enable the support of various algorithms. Accordingly, IPsec comprises a plurality of protocols. The IPsec security is characterized by protection of data against tampering and leakage. IPsec can establish communication if the connection source and destination clients comply with IPsec and an intermediary network supports the IP. Accordingly, there is an advantage of providing a wide applicable range without the need for special apparatus. When the IPsec security is used for iSCSI to perform authentication, the client can access the storage via LAN/MAN/WAN. IPsec architecture is described in detail in "Security Architecture for the Internet Protocol" (RFC2401).

The SAN's zoning capability limits the number of logical volumes for the storage device to the number of FC ports. However, there is an operational problem because the storage device is actually used by a small number of clients.

The above-mentioned prior art has the following problems.

When a client accesses the storage via the LAN/MAN/WAN, the SAN and the LAN/MAN/WAN need to ensure security. The SAN can ensure security by using its zoning capability. The LAN/MAN/WAN can ensure the security by combining iSCSI with a data protection system on communication paths. However, IPsec cannot guard against "disguise" and is not versatile for all network environments. For example, a client may access the storage from a wide area via networks that cannot ensure the security or the line quality. In such case, each network must use an appropriate data protection system in order to provide the client with a more secure and reliable access. Consequently, the VPN needs to comprise not only a single type, but also a plurality of types.

When the client accesses the storage via the LAN/MAN/WAN, a volume needs to be allocated to each client. iSCSI can allow a plurality of clients to access the FC port, but has no capability to allocate a logical volume to each client. Although it is possible to improve the scalability of the number of connectable clients, there remains a problem of improving the scalability of the number of logical volumes.

SUMMARY OF THE INVENTION

One preferred aspect of the present invention is directed to a storage system comprising a storage device and a client connected to a virtual private network using the storage device, wherein the system comprises: a management apparatus that manages the storage device by means of a logical volume assigned to the storage device; a conversion apparatus that converts a protocol corresponding to the storage device and a protocol used for the virtual private network; and a mapping means that stores a virtual private network allocated to the client and an access range of the storage device corresponding to the virtual private network.

In another preferred aspect, a conversion apparatus according to the present invention is connected to a storage device and is characterized in that the conversion apparatus is connected to a client using the storage device via a virtual private network, wherein the conversion apparatus comprises: a protocol conversion means for converting a protocol corresponding to the storage device and a protocol used for the virtual private network; and a mapping means that stores a virtual private network allocated to the client and an access range of the storage device corresponding to the virtual private network.

In still another preferred aspect, a storage access method according to the present invention is used for a storage system comprising a storage device, a client connected to a virtual private network, and a conversion apparatus that is connected to the client via the virtual private network and converts a protocol for the storage device and a protocol used for the virtual private network, wherein the conversion apparatus, upon reception of an access request from the client via the virtual private network, writes data to the storage device connected to the conversion apparatus based on a check result of identification information about the virtual private network; and the conversion apparatus, upon reception of a response for write termination from the storage device, returns the response for write termination to the client to terminate a process to write data from the client.

In yet another preferred aspect, the present invention provides a storage system comprising a storage device and a client connected to a virtual private network using the storage device, the system characterized by having: a management apparatus that manages the storage device by means of a logical volume assigned to the storage device; a conversion apparatus that converts a protocol corresponding to the storage device and a protocol used for the virtual private network; and a mapping means that stores a virtual private network allocated to the client and an access range of the storage device corresponding to the virtual private network. Consequently, the storage system according to the present invention simultaneously prevents unauthorized access and ensures the volume management scalability.

Namely, when a client accesses a storage device via a network (LAN/MAN/WAN), the system according to the present invention identifies a virtual private network (VPN) used by the client and limits the range of accesses to addresses in a logical volume of the storage device. Consequently, the system can prevent unauthorized access or wiretapping and improve the volume management scalability by dividing a logical volume into portions and allocating them to a plurality of clients.

Further, a conversion apparatus is provided with a mapping (conversion tables 40 and 49) between virtual private networks and a range of accesses to the storage device. Accordingly, the virtual private network is defined only between the conversion apparatus and a client that has a valid access privilege for the storage device. Therefore, identifying the virtual private network can identify the client and prevent unauthorized access.

Other and further objects, features and advantages of the invention will appear more fully from the following description.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 3 is an explanatory diagram of a client information table managed by a management apparatus according to the first preferred embodiment of the present invention;

FIG. 4 is an explanatory diagram of a conversion apparatus information table managed by the management apparatus according to the first preferred embodiment of the present invention;

FIG. 5 is an explanatory diagram of a virtual volume information table managed by the management apparatus according to the first preferred embodiment of the present invention;

FIG. 6 is an explanatory diagram of a storage information table managed by the management apparatus according to the first preferred embodiment of the present invention;

FIG. 8 is an explanatory diagram showing the relationship between a virtual volume and a logical volume;

FIG. 9 is an explanatory diagram of a conversion table for a conversion apparatus 24 according to the first preferred embodiment of the present invention;

FIG. 10 is an explanatory diagram of a conversion table for a conversion apparatus 25 according to the first preferred embodiment of the present invention;

FIG. 17 is an explanatory diagram showing a log table according to the first preferred embodiment of the present invention;

FIG. 25 shows a network configuration according to a third preferred embodiment of the present invention;

FIG. 26 shows a network configuration including a plurality of networks according to a fourth preferred embodiment of the present invention.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description of the present invention and the preferred embodiment(s) thereof is set forth in detail below with reference to the attached drawings.

Figure 1:
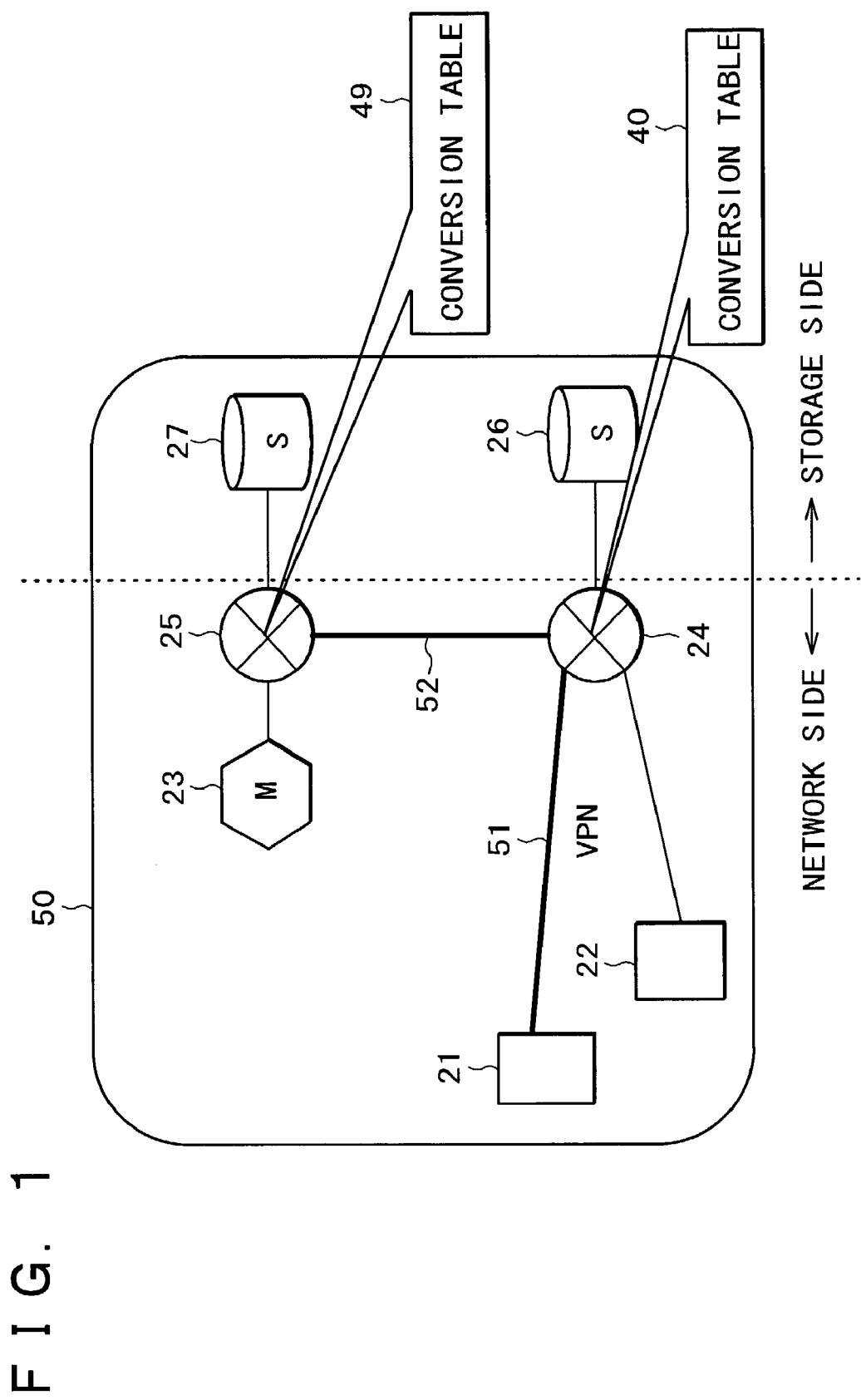
FIG. 1 is a network configuration diagram according to a first preferred embodiment of the present invention.

FIG. 1 shows the configuration of the storage system according to a first preferred embodiment of the present invention. Unlike the other preferred embodiments to be described below, the first embodiment shown in FIG. 1 is applied to an internal network. In FIG. 1, the reference numerals 21 and 22 represent clients, 23 a management apparatus, 24 and 25 conversion apparatuses, 26 and 27 storage devices, and 50 a network.

The conversion apparatus 24 connects with the clients 21 and 22, the storage device 26, and the conversion apparatus 25. The conversion apparatus 24, the clients 21 and 22, and the conversion apparatus 25 are connected to each other by a network protocol comprising Ethernet, ATM, IP, etc. An iSCSI interface is used for an access request from the conversion apparatus 24 to the storage device 26. An FC protocol is used to connect the conversion apparatus 24 and the storage device 26. A SCSI interface is used for an access request to the storage device.

The conversion apparatus 25 connects with the conversion apparatus 24, a management apparatus 23, and a storage device 27. The conversion apparatus 25 and the management apparatus 23 are connected to each other by the network protocol comprising Ethernet, ATM, IP, etc. The FC protocol is used to connect the conversion apparatus 25 and the storage device 27.

A VPN is provided between the client 21 and the conversion apparatus 24, between the client 22 and the conversion apparatus 24, and between the conversion apparatus 24 and the conversion apparatus 25.

The management apparatus 23 manages the conversion apparatuses 24 and 25, the storage devices 26 and 27, and the clients 21 and 22. The management apparatus 23 previously allocated virtual volumes of the storage devices 26 and 27 to the client 21. After authenticating the client 21, the management apparatus 23 specifies a VPN having VPN-ID and also manages the specified VPN information.

The clients 21 and 22 were previously provided with an IP address of the management apparatus 23 or means for identifying the IP address of the management apparatus 23. The means used for identifying IP addresses include a directory service, a Web service, a UDDI (Universal Description, Discovery and Integration), and a DNS (Domain Name System).

The UDDI specification is developed by the UDDI project and is described in "UDDI Technical White Paper" copyright by ARIBA, Inc., INTERNATIONAL BUSINESS MACHINES CORPORATION, and MICROSOFT CORPORATION. The DNS is described in "DOMAIN NAMES—CONCEPTS AND FACILITIES" (RFC1034) and "DOMAIN NAMES—IMPLEMENTATION AND SPECIFICATION" (RFC1035) published by IETF.

Figure 2:
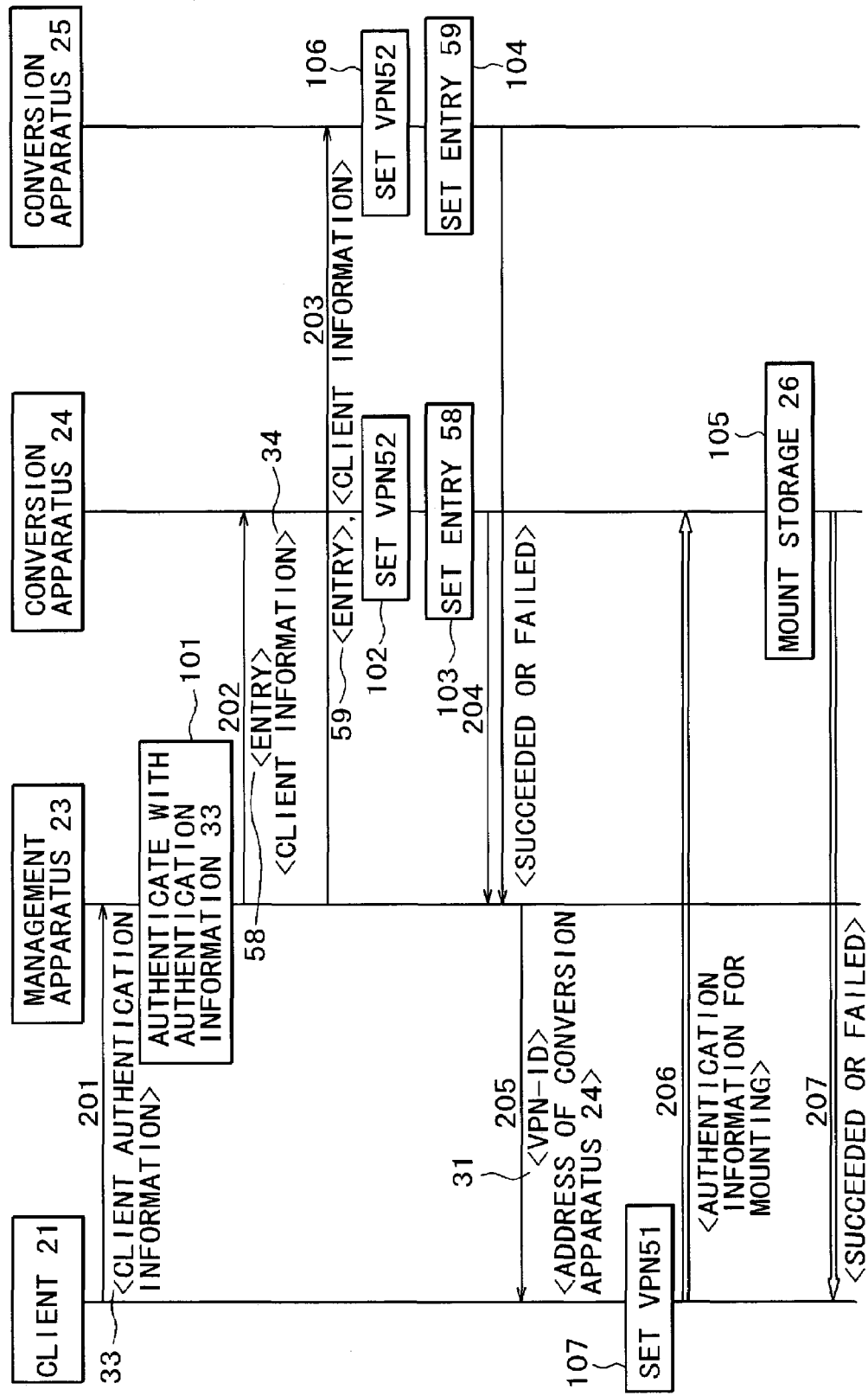
FIG. 2 is a sequence diagram showing a procedure for using a virtual volume by the client according to the first preferred embodiment of the present invention.

FIG. 2 is a sequence diagram showing a procedure of using a virtual volume by the client.

The client 21 sends client authentication information 33 including a user ID, a password, and client information 34 to the management apparatus 23 via the conversion apparatuses 24 and 25 (process 201).

The client information 34 can be used to identify applications or traffic passing a VPN. The client information 34 includes an MAC (Media Access Control) address, a VLAN (Virtual LAN) tag, an IP address, a TCP (Transmission Control Protocol) or UDP (User Datagram Protocol) port number, DSCP (Diffserv Code-Point) defined in Diffserv (Differentiated Services) a flow label in the IPv6, etc.

The VLAN and the VLAN tag are specified in the "IEEE Standards for Local and Metropolitan Area Networks: Virtual Bridged Local Area Networks" (ISBN 0-7381-1538-X SS94709) published by IEEE (The Institute of Electrical and Electronics Engineers, Inc.) Diffserv is specified in "An Architecture for Differentiated Services" (RFC2475) and "Definition of the Differentiated Services Field (DS Field) in the IPv4 and IPv6 Headers" (RFC2474) both published by IETF.

Process 101 shows client authentication processing. Based on the client authentication information 33 received from the client 21, the management apparatus 23 authenticates whether or not a virtual volume is allocated to the client 21.

FIGS. 3 through 7 show information managed by the management apparatus 23.

Figure 7:
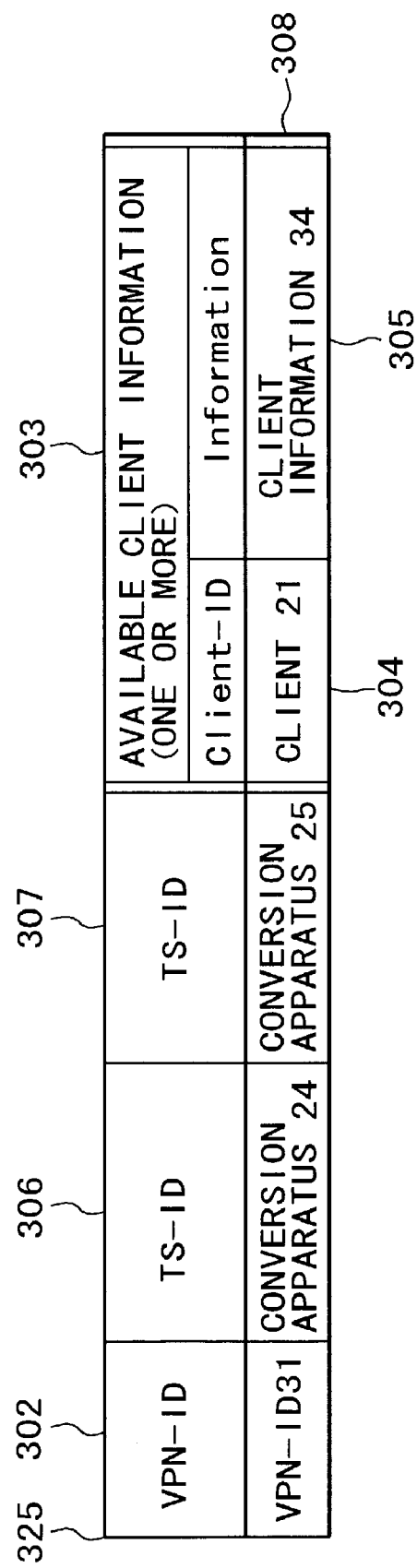
FIG. 7 is an explanatory diagram of a VPN setup information table managed by the management apparatus according to the first preferred embodiment of the present invention.

A client information table 321 in FIG. 3 shows the contents of client information managed by the management apparatus 23. Client-ID 304 denotes a client name, Auth 301 authentication information, VPN-ID 302 a name of VPN to be connected, and Vol-ID 309 a virtual volume name. A conversion apparatus information table 322 in FIG. 4 shows the contents of a conversion apparatus which the management apparatus 23 manages. TS-ID 312 denotes a conversion apparatus name, Address a virtual volume address, ST-ID 313 a storage name, and Vol-ID 310 a virtual volume name. The virtual volume information table 323 in FIG. 5 shows the contents of a virtual volume that the management apparatus 23 manages. Range 318 denotes a range of virtual addresses for the virtual volume. A storage information table 324 in FIG. 6 shows the contents of the storage information that the management apparatus 23 manages. Virtual volume allocation 315 shows to which address and range a virtual volume belongs. VPN setup information table 325 in FIG. 7 shows the contents of VPN setup information that the management apparatus 23 manages. Available client information 303 comprises Client-ID 304 and Information 305 that are assigned a client name and client information, respectively.

In FIG. 2, the management apparatus 23 uses the client information table 321 (see FIG. 3) to authenticate the client 21. When accessed from the client 21, the management apparatus 23 references the client information table 321 and compares the authentication information 33 with Auth 301 in an entry 326 whose Client-ID 304 contains a value for the client 21. Upon successful authentication of the client 21, the management apparatus 23 determines VPN-ID31 for the client 21 based on the client information table 321. Upon unsuccessful authentication thereof, the management apparatus 23 rejects the access.

When succeeding in authenticating the client 21, the management apparatus 23 creates a new entry 308 in the VPN setup information table 325 (see FIG. 7). The VPN-ID 302 in the entry 308 specifies VPN-ID31 determined when the management apparatus 23 succeeded in authenticating the client 21. The available client information 303 specifies information about the client 21. This information is obtained during the authentication process 101. The available client information 303 comprises Client-ID 304 and Information 305 that are assigned the client 21 and the client information 34, respectively.

TS-ID 306 for the entry 308 in the VPN setup information table 325 (see FIG. 7) indicates the identifier of a conversion apparatus specified for an original side. TS-ID 307 indicates the identifier of a conversion apparatus specified for a backup side. This identifier is information needed for the management apparatus 23 to access the client's IP address or the conversion apparatus.

In order to set values for the TS-IDs 306 and 307, it is necessary to know the virtual volumes available for the client 21. A virtual volume 16 is obtained as an available virtual volume. The virtual volume 16 is specified as a value of the Vol-ID 309 for the entry 326 in the client information table 321 (see FIG. 3). Then, it is necessary to know identification information about the conversion apparatus to which the storage device is connected. Since a virtual volume comprises one or more logical volumes, there is a storage device having a logical volume constituting the virtual volume. However, information about the storage itself is unnecessary for the entry 308. The management apparatus 23 then retrieves an entry having the virtual volume 16 from the Vol-ID 310 in the virtual volume information table 323 (see FIG. 5). The management apparatus 23 obtains the conversion apparatuses 24 and 25, i.e., values for an entry 327 having the value for the virtual volume 16 corresponding to the Vol-ID 310. The entry 308 is completed by setting the conversion apparatuses 24 and 25 to the TS-IDs 306 and 307 for the entry 308 in the VPN setup information table 325 (FIG. 7).

FIG. 8 shows the relationship between a virtual volume allocated to the client 21 and an actual secure storage system.

The virtual volume 16 comprises a logical volume 13 in the storage device 26 and a logical volume 15 in the backup storage device 27. When the client 21 starts using the virtual volume 16, the management apparatus 23 allocates VPN-ID31, defines the conversion apparatus 24 as an original and the conversion apparatus 25 as a backup, and sends VPN-ID31 and identification information about the conversion apparatus 24 to the client 21. When the client 21 sends an access request to the virtual volume 16 based on this identification information, the conversion apparatus 24 converts that access request to an access request to the logical volume 13 in the actual storage device 26. In this manner, the client 21 can access the storage device 26.

The conversion apparatuses 24 and 25 include the conversion tables 40 and 49 (see FIGS. 9 and 10). Using these tables, the client provides an access limitation when accessing virtual volumes, converts protocols, converts addresses to logical addresses allocated to the actual storage devices 26 and 27, etc.

FIG. 9 shows an example of the conversion table 40. VPN identifier 41 corresponds to a VPN identifier when the client accesses a conversion apparatus. An address range 42 shows a range of virtual addresses for data in a virtual volume allocated to the client. Storage identification information 43 provides identification information about a storage device having a logical volume constituting a virtual volume allocated to the client. An offset 44 specifies an offset address for generating, from a virtual address, a logical address of the storage device provided in the storage identification information 43. A backup conversion apparatus 45 indicates identification information about the conversion apparatus which the management apparatus 23 defines as a backup for the client. The conversion table 40 specifies the relationship among these pieces of information.

The storage identification information 43 shows an FC port. The offset address 44 indicates an LUN (Logical Unit Number) or an LBA (Logical Block Address).

In FIG. 9, entries 46 and 47 are presented as an example of the same VPN identifier 41 and the different address ranges 42. In this example, the virtual volume 16 can comprise a plurality of logical volumes because the entries 46 and 47 allocate one virtual volume to different storage devices.

An entry 48 shows an example of no specifications for the address range 42 and the backup conversion apparatus 45. When the address range 42 is not specified, only the VPN identifier 41 determines the storage identification information 43 and the offset address 44. No specification for the backup conversion apparatus 45 indicates that the conversion apparatus having this conversion table is specified as the backup conversion apparatus for a virtual volume allocated to the VPN identifier 41 in the entry 48.

The management apparatus 23 sends an entry 58 in the conversion table and the client information 34 for the client 21 to the conversion apparatus 24 (process 202 in FIG. 2). The entry 58 comprises five items: (1) the VPN identifier 41 indicating VPN-ID31; (2) the address range 42 indicating address range RANGE1 corresponding to a range of addresses for the virtual volume the client 21 accesses; (3) the storage identification information 43 indicating identification information about the storage device 26; (4) the offset 44 indicating offset address OFFSET1 for generating a logical address in the storage device 26; and (5) the backup conversion apparatus 45 indicating identification information about the conversion apparatus 25 as a backup destination conversion apparatus.

Likewise, the management apparatus 23 sends an entry 59 (FIG. 10) in the conversion table and the client information 34 for the client 21 also to the conversion apparatus 25 (process 203 in FIG. 2). The entry 59 comprises five items: (1) the VPN identifier 41 indicating VPN ID31; (2) the address range 42 indicating address range RANGE1; (3) the storage identification information 43 about the storage 27; (4) the offset 44 indicating OFFSET2; and (5) the backup conversion apparatus 45 with nothing specified because the conversion apparatus 25 works as a backup.

The management apparatus 23 creates the entry 58 in the conversion table 40 for the conversion apparatus 24 in the following procedure.

When creating the entry 308, the management apparatus 23 obtains values for VPN-ID31, the client 21, the virtual volume 16, and the conversion apparatuses 24 and 25. However, the management apparatus 23 does not obtain values of a storage device and an address range in the conversion apparatus 24 needed for the virtual volume because these values are not retrieved during creation of the entry 308. The management apparatus 23 then retrieves the conversion apparatus 24 as a value of the TS-ID 306 for the entry 308 from the TS-ID 312 in the conversion apparatus information table 322 (FIG. 4) and finds an entry 328 containing the conversion apparatus 24. This retrieval aims at finding a storage device having the virtual volume 16. The management apparatus 23 retrieves all values for the ST-ID 313 in the entry 328 from the ST-ID 314 in the storage information table 324 (FIG. 6). The management apparatus 23 finds an entry 319 where the Vol-ID 316 for the virtual volume allocation 315 records the virtual volume 16.

According to a sequence of retrievals, the management apparatus 23 assigns the Offset 317 for the virtual volume 351 in the entry 319 (FIG. 6) to the offset 44 in the entry 58 (FIG. 9); the Range 318 for the virtual volume 315 to the address range 42 in the entry 58; and the corresponding ST-ID 314 in the entry 319 to the storage identification information 43 in the entry 58. Finally, the management apparatus 23 assigns VPN-ID31 to the VPN identifier 41 in the entry 58 and the conversion apparatus 25 to the backup conversion apparatus 45 in the entry 58 to create the entry 58. The entry 59 is also created according to a similar procedure.

Figure 11:
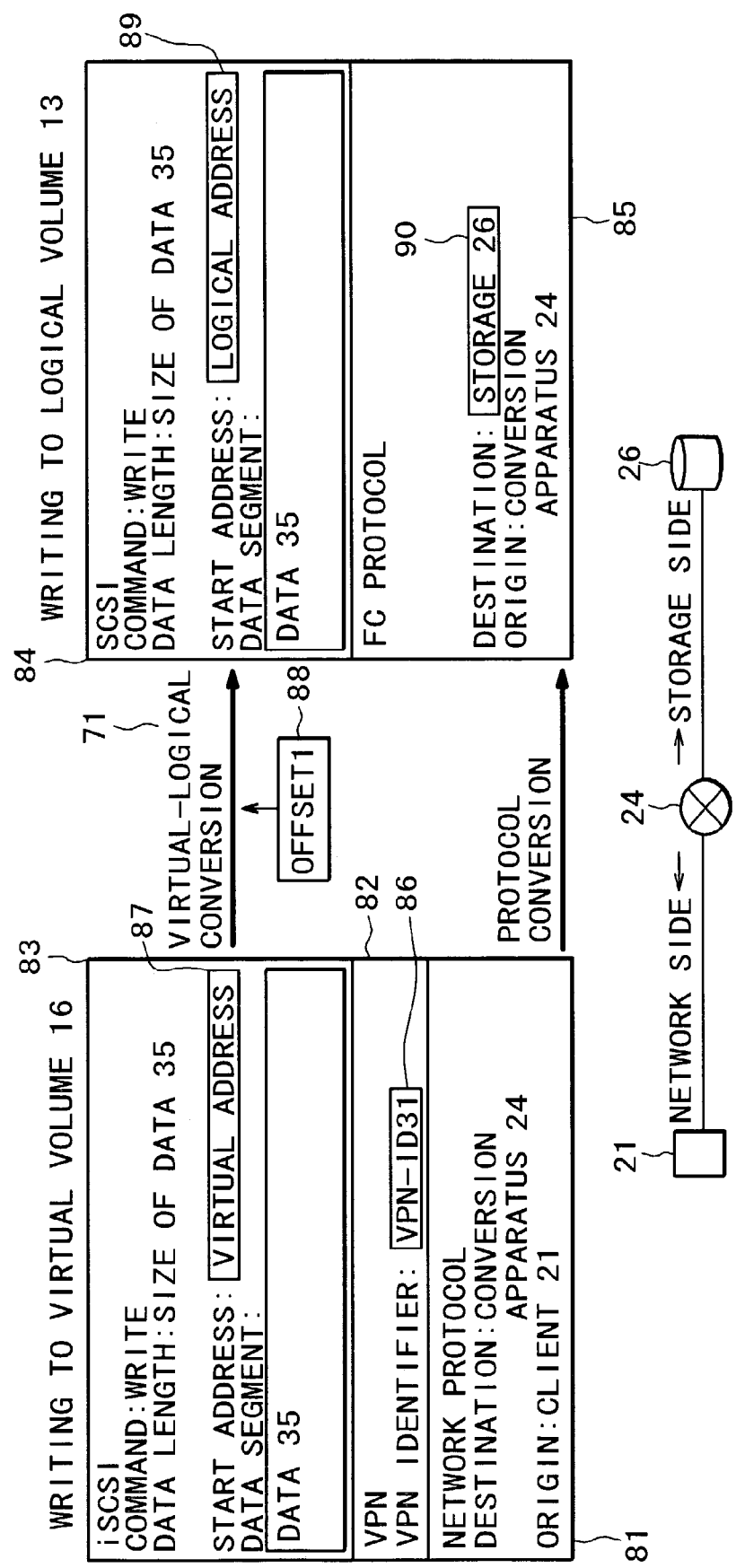
FIG. 11 is an explanatory diagram showing address conversion and communication protocol conversion based on an access request from the client according to the first preferred embodiment of the present invention.

FIG. 11 is a schematic diagram showing that the client 21 accesses the storage device 26 via the conversion apparatus 24 by converting an access-requested virtual address to a logical address.

In FIG. 11, the reference numeral 81 shows an example of the network protocol header; 82 an example of the VPN header; 83 an example of access request by iSCSI; 84 an example of access request by SCSI; and 85 an example of the FC protocol header. Since the client 21 writes data 35 to the virtual volume 16, a virtual address is used for an address 87 to start writing the access request 83. Actually, the data 35 is written to the logical volume 13. Accordingly, the conversion apparatus 24 needs to convert the virtual address 87 to a logical address 89.

When receiving an access request from the client 21, the conversion apparatus 24 references a VPN identifier 86 in the VPN header, and checks the conversion table 40 for VPN-ID31. The conversion apparatus 24 uses an offset address 88 and a virtual-logical conversion 71 to convert the virtual address 87 for the access request 83 to the logical address 89. The conversion apparatus 24 assigns; as a transmission destination 90, the storage device 26 specified for the storage identification information 43 in the entry 58 of the conversion table 40, and then uses the FC protocol to send the access request 84.

Figure 12:
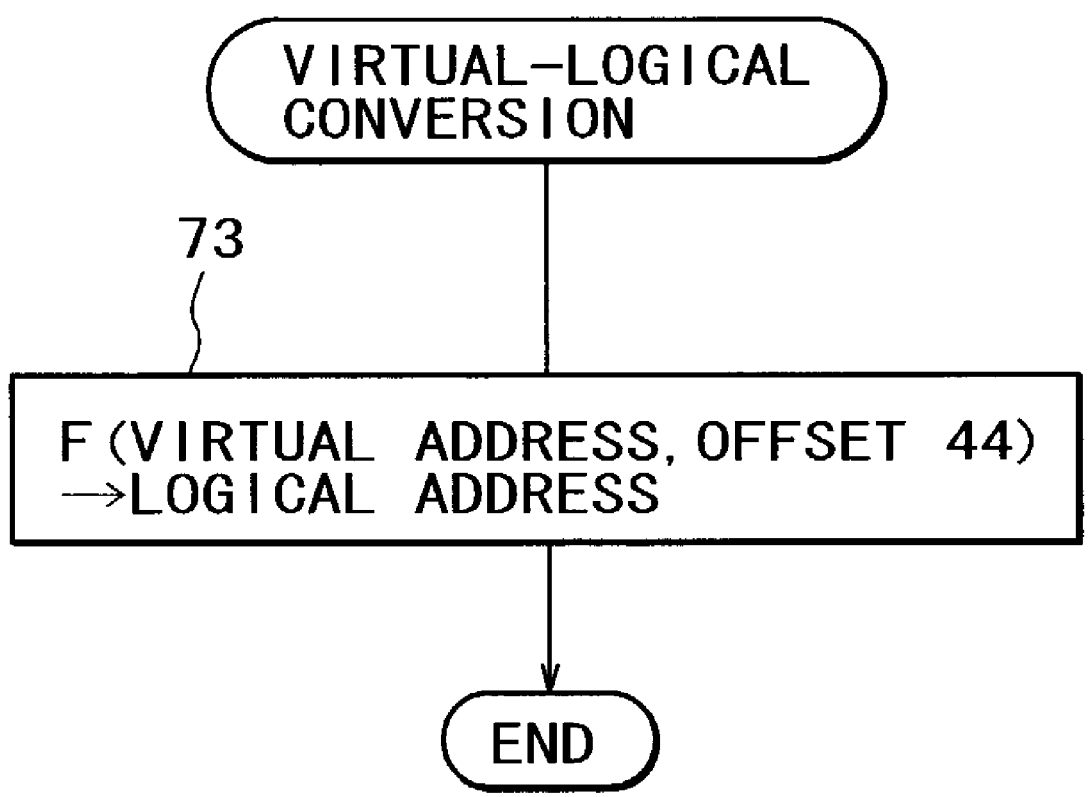
FIG. 12 is a flowchart showing address conversion from a virtual address to a logical address according to the first preferred embodiment of the present invention.
Figure 13:
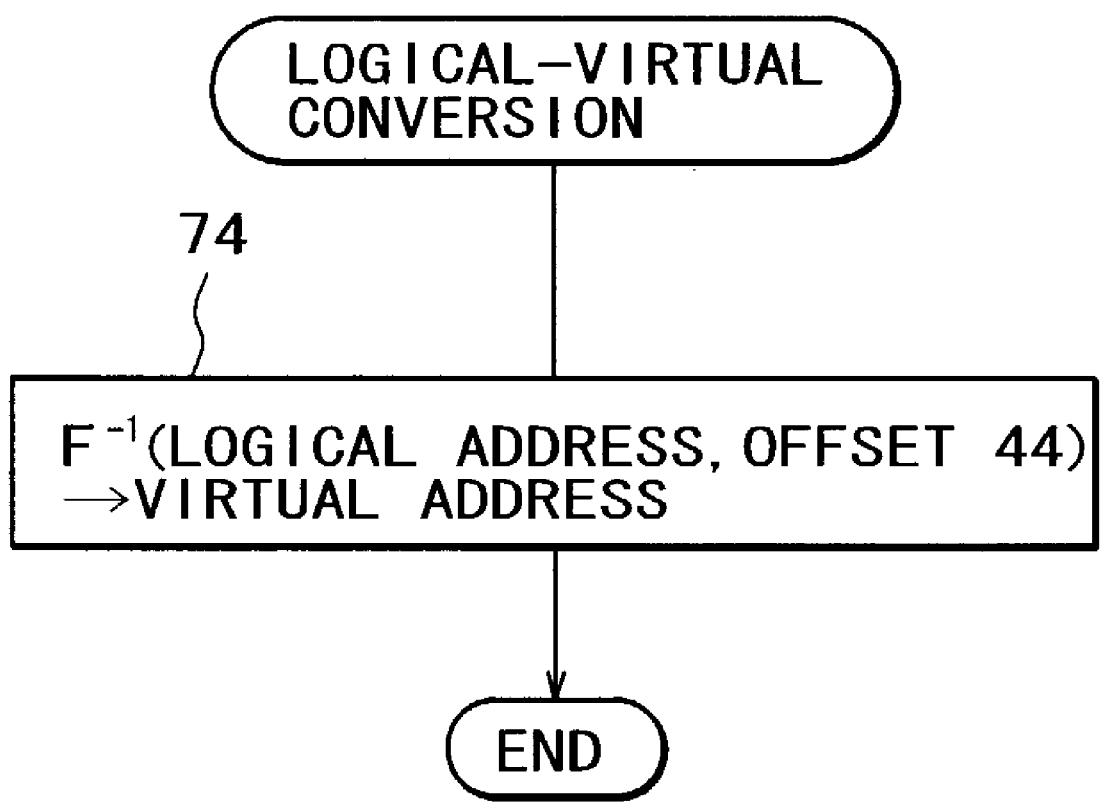
FIG. 13 is a flowchart showing address conversion from a logical address to a virtual address according to the first preferred embodiment of the present invention.

FIG. 12 shows a virtual-logical conversion process. FIG. 13 shows a logical-virtual conversion process. The process in FIG. 12 converts a virtual address to a logical address by means of a function 73 that uses the virtual address and an offset address 44 as arguments. The function 73 generates a logical address by performing an addition or an OR operation based on the virtual address and the offset address 44. The process in FIG. 13 converts a logical address to a virtual address by means of a function 74 that uses the logical address and the offset address 44 as arguments. The function 74 generates a virtual address by performing a subtraction or an AND operation based on the logical address and the offset address 44.

In FIG. 2, a process 102 shows a VPN setup process. The management apparatus 23 sets a VPN 52 according to VPN-ID 31 between the conversion apparatuses 24 and 25, and also sets a VPN 51 according to VPN-ID31 between the conversion apparatus 24 and the client 21.

The process 103 shows assigning an entry of the conversion table to the conversion apparatus 24. The management apparatus 23 assigns the entry 58 of the conversion table to the conversion table 40 (FIG. 9) provided for the conversion apparatus 24. Like the process 103, a process 104 shows assigning an entry of the conversion-table to the conversion apparatus 25. The management apparatus 23 also assigns the entry 59 of the conversion table 49 to the conversion apparatus 25 as well as the entry 58 assigned to the conversion apparatus 24.

The management apparatus 23 receives results of the processes 102, 103, 104, and 106 from the conversion apparatuses 24 and 25 (process 204). When the process results are successful, the management apparatus 23 sends an authentication response to the client 21 via the conversion apparatuses 25 and 24 (process 205). When any of the processes 102, 103, 104, and 106 fails, the management apparatus 23 releases the setting for the VPN 51 and the settings for the entries 58 and 59, and rejects the access from the client 21. When the authentication succeeds, the client 21 receives VPN-ID31 and the identification information about the conversion apparatus 24 from the management apparatus 23 (process 205).

The client 21 performs the setup process 107 for the VPN 51 according to VPN-ID31, accesses the conversion apparatus 24, and performs a mount process to use a virtual volume for the client 21 (process 206). The process 105 shows mounting a virtual volume. Based on VPN-ID31, the conversion apparatus 24 assumes the storage 26 to be appropriate to a virtual volume for the client 21 from the entry 58 in the conversion table, and performs a mount process for the storage 26. The client 21 receives a response from the conversion apparatus 24 (process 207) and mounts the virtual volume to start using it.

Figure 14:
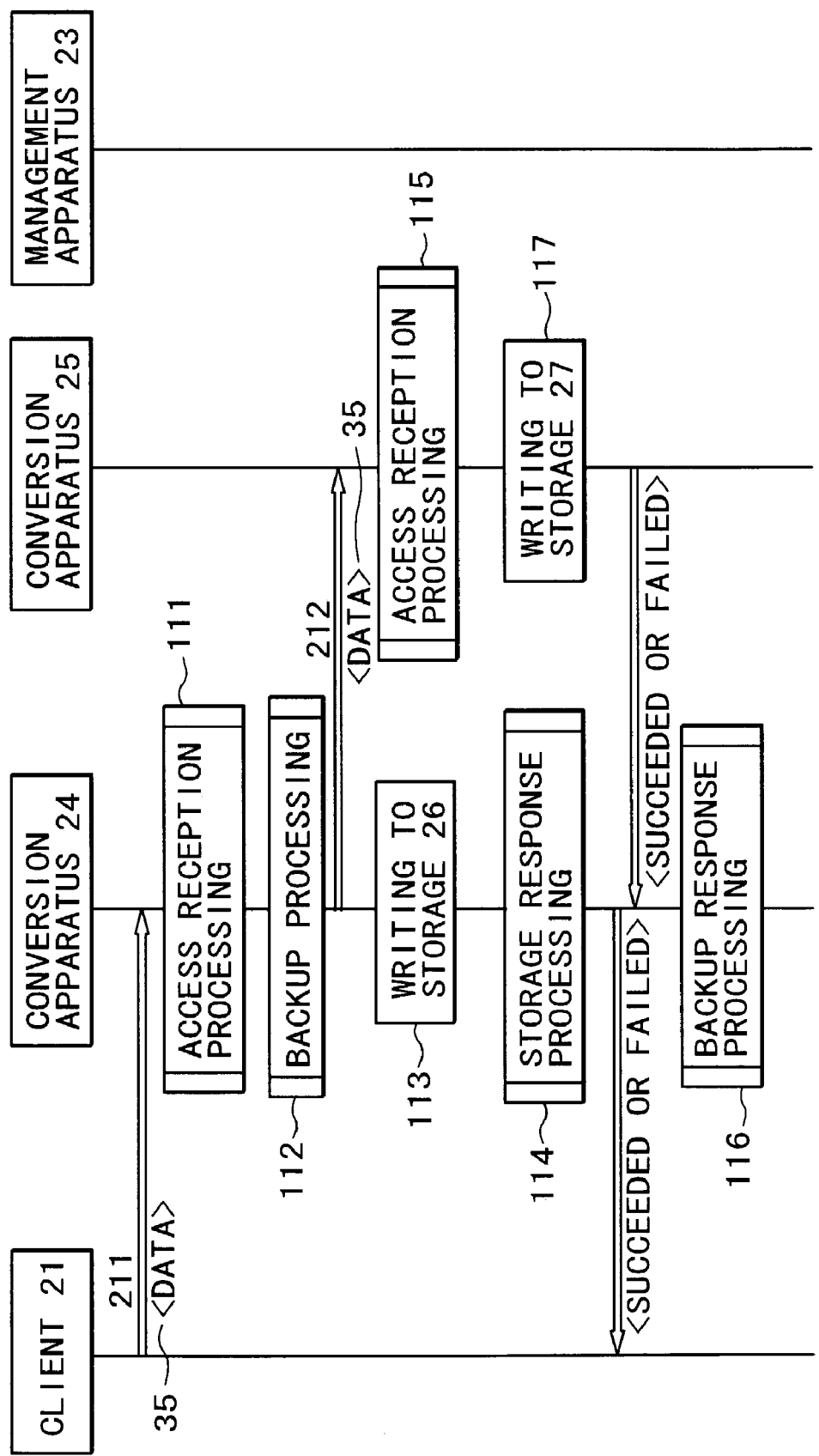
FIG. 14 is a sequence diagram showing a process of writing data to a virtual volume by the client according to the first preferred embodiment of the present invention.

FIG. 14 shows a sequence of writing data 35 to the virtual volume 16 by the client 21.

The client 21 sends an access request including a write command to the conversion apparatus 24 via the VPN 51 specified in VPN-ID31 (process 211). The conversion apparatus 24 performs an access reception process 111 to check if the VPN identifier 41 in the conversion table 40 (FIG. 9) contains an entry having VPN-ID31. The conversion apparatus 24 then references the entry 58 specified in the conversion table 40 and performs a backup process 112 to the conversion apparatus 25. After the process 112, the conversion apparatus 24 sends an access request to the conversion apparatus 25 (process 212) and performs a process 113 to write data 35 to the storage device 26.

When receiving a response indicating termination of the writing from the storage device, the conversion apparatus 24 performs a storage device response process 114 and returns a response from the storage device to the client 21 (process 213). When receiving the access request from the conversion apparatus 24 (process 212), the conversion apparatus 25 performs an access reception process 115 based on the conversion table 49 in the same manner as the process for the conversion apparatus 24. When VPN-ID 31 matches the VPN identifier 41 for the entry 59 in the conversion table 49, the conversion apparatus 25 performs a process 117 to write the data 35 to the storage device 27. When receiving a response from the storage device 27, the conversion apparatus 25 returns a response indicating termination of the writing to the conversion apparatus 24 (process 214). When receiving the response from the conversion apparatus 25, the conversion apparatus 24 performs a backup response process 116 and completes the write process from the client 21.

Figure 15:
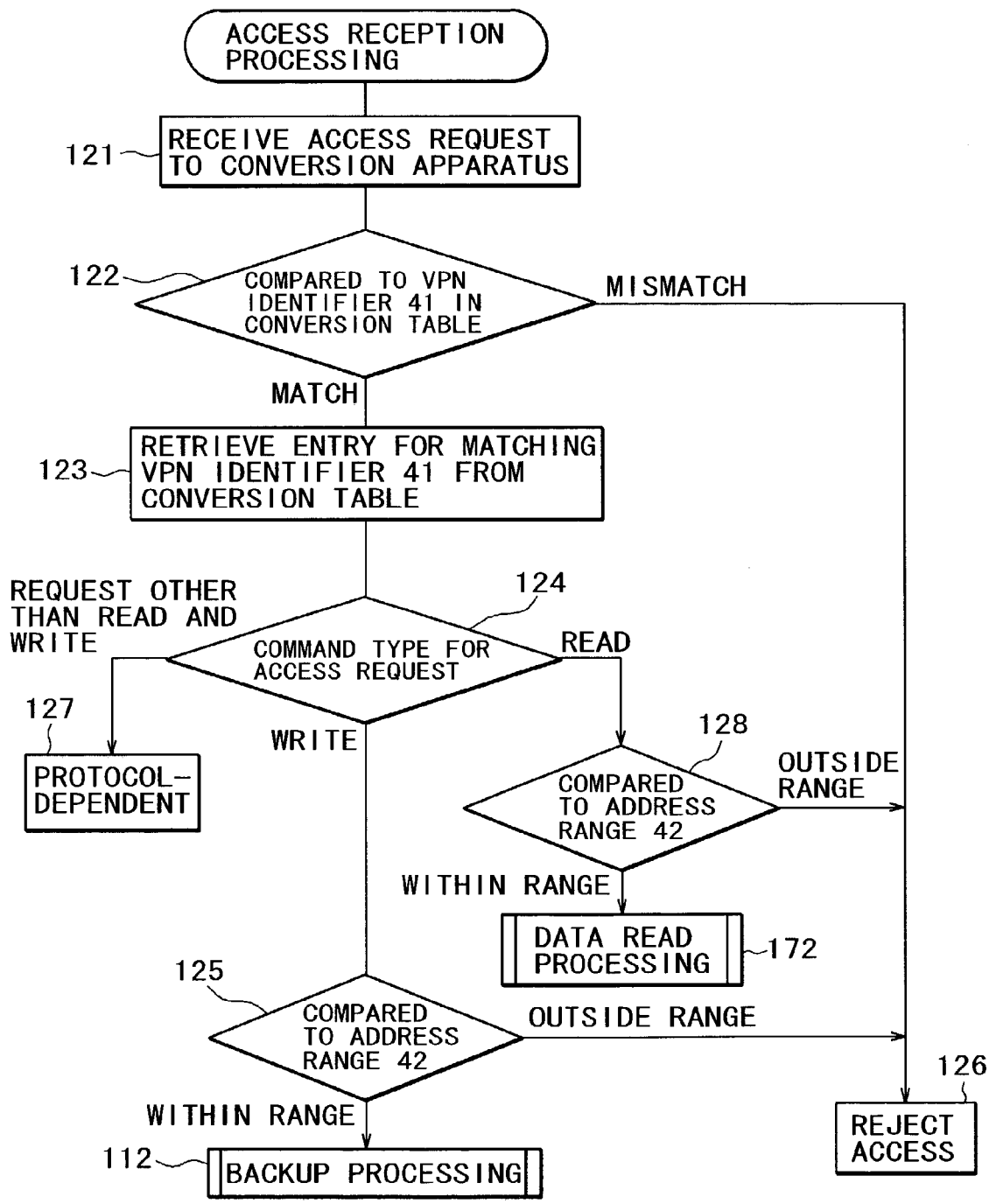
FIG. 15 is a flowchart showing a process of the conversion apparatus to receive access to a virtual volume from the client according to the first preferred embodiment of the present invention.

FIG. 15 shows a detailed flowchart of the process 111 in FIG. 14. FIG. 15 shows a sequence of processes when the conversion apparatus receives an access request.

A process 121 is performed when the conversion apparatus receives an access request from the client or the conversion apparatus. A process 122 checks if the VPN identifier 41 in the conversion table 40 or 49 (FIG. 9 or 10) contains the VPN-ID of a VPN that delivered the access request. If the VPN identifier 41 in the conversion table contains the VPN-ID, control proceeds to the next process 123. If no match is found, control proceeds to a process 126 to reject the access request. In FIG. 14, the conversion table 40 of the conversion apparatus 24 includes the entry 58 that matches VPN-ID31 of the VPN 51. Consequently, control proceeds to the process 123. The process 123 extracts the relevant entry from the VPN identifier 41 for reference.

The process 124 determines a command type of the access request. When the access is "writing", control proceeds to the process 125. When the access is "reading", control proceeds to the process 128. When the access is neither "writing" nor "reading", control proceeds to the process 127. In FIG. 15, the access request is a "write" command. Therefore, control proceeds to the process 125.

The process 125 checks if an address portion of the access request matches the access request's address range specified in the entry enabled for reference by the process 123. If the address portion is within the range, control proceeds to the process 112. If the address portion is outside the range, control proceeds to the access rejection process 126 and client 21 is denied access. When the process 124 determines that the access request is a read command, the process 128 checks the address range in the same manner as the write process. If the address is within the range, control proceeds to a data read process 172. If the address is within the range, control proceeds to the access rejection process 126. When the process 124 determines that the access request is neither a read command nor a write command, control proceeds to a process 127 that depends on the access request.

Figure 16:
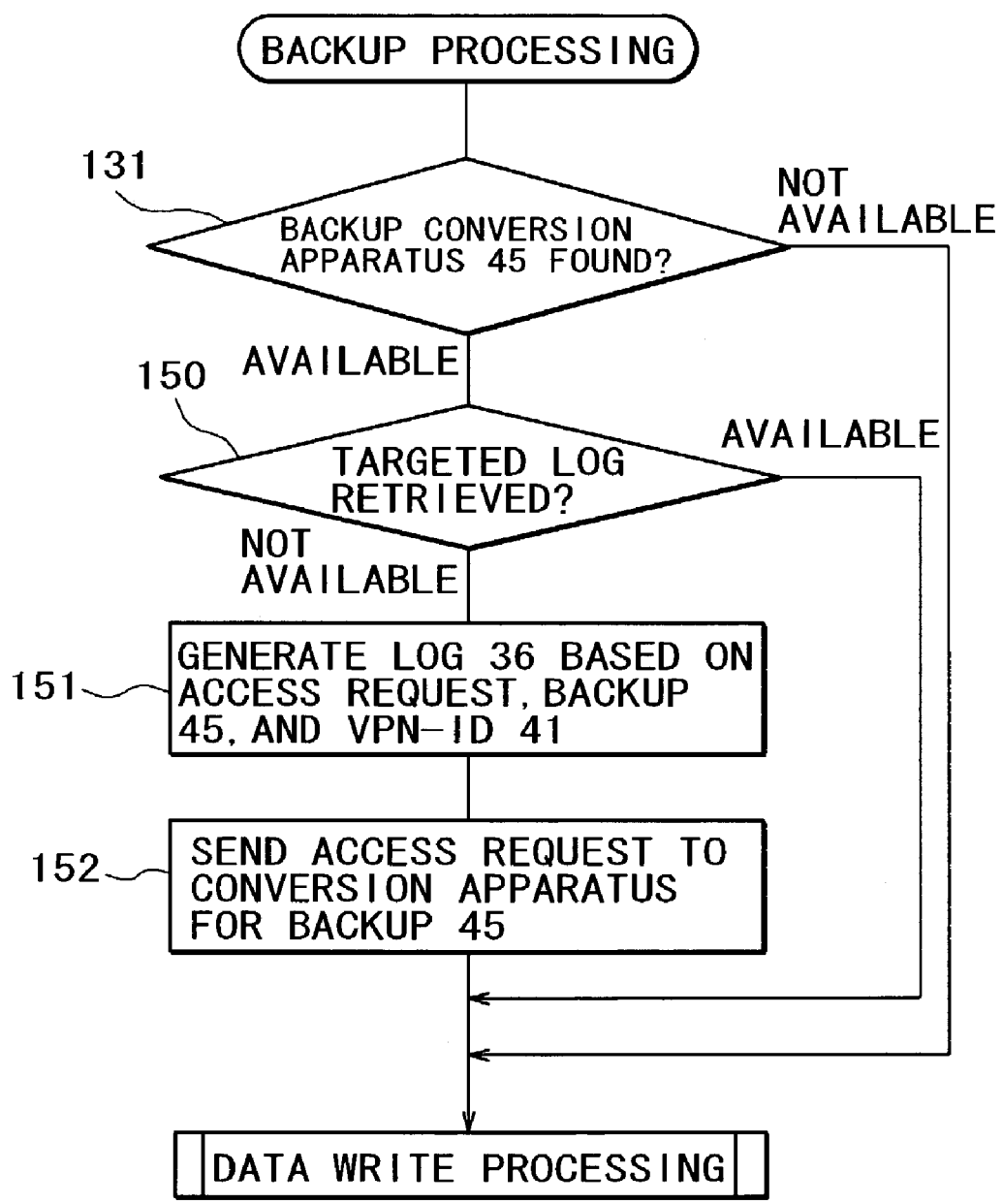
FIG. 16 is a flowchart showing a backup process of the conversion apparatus to a backup conversion apparatus according to the first preferred embodiment of the present invention.

FIG. 16 shows a detailed flowchart of the process 112 in FIG. 14. FIG. 16 shows a sequence of processes for the backup conversion apparatus.

The process 131 determines whether or not the backup 45 is specified in the entry enabled for reference by the process 123 in FIG. 15. If the backup 45 is specified, control proceeds to a process 150. Otherwise, control proceeds to the process 113 for writing data. In FIG. 14, the conversion apparatus 25 is specified as the backup 45 in the entry 58 (FIG. 9). Accordingly, the conversion apparatus 24 performs the process 150 to retrieve logs 36 and 37 (see FIG. 17) created when the backup process is performed. At this time, the original conversion apparatus has a log table 39 to prevent duplicate transmission of an access request to the backup conversion apparatus.

The write log table 39 is intended for synchronization of data writing between the original conversion apparatus and the backup conversion apparatus. A log entry comprises an access request 330, the backup conversion apparatus 45, the VPN identifier 41, the storage identification information 43, and a data start address 334. The log 36 records the start of writing to a storage device connected to the original conversion apparatus. The log 37 records the end of writing to the storage device connected to the original conversion apparatus.

The process 150 retrieves a targeted log. If the log is found, control proceeds to the process 113 for writing data. Otherwise, control proceeds to the process 151. The process 151 creates the log 36 based on the access request, the backup conversion apparatus 45, and the VPN identifier 41. In FIG. 14, the process creates the log based on a write command from the client 21, the conversion apparatus 25, and VPN-ID31. The process 152 sends an access request to a conversion apparatus specified for the backup conversion apparatus 45 via a VPN having the VPN identifier 41. In FIG. 14, an access request from the client 21 is sent to the conversion apparatus 25 via the VPN 51.

Figure 18:
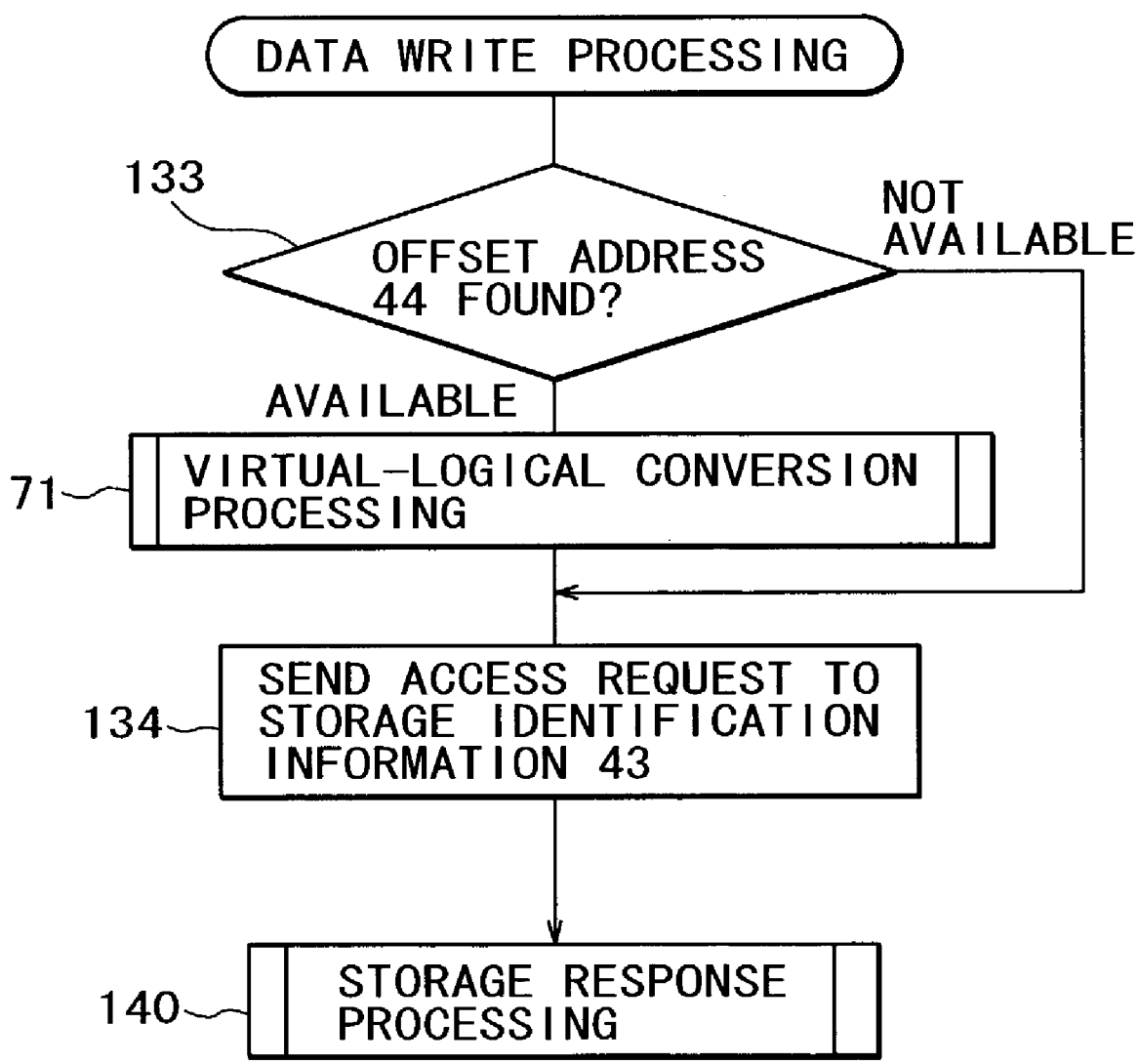
FIG. 18 is a flowchart showing a data write process of the conversion apparatus to a storage device according to the first preferred embodiment of the present invention.

FIG. 18 shows a detailed flowchart of the data writing process 113 in FIG. 14. FIG. 18 shows the sequence of processes for writing to a storage device connected to the conversion apparatus.

The process 133 determines whether or not the offset 44 is specified in the entry enabled for reference in FIG. 15. If the offset 44 is specified, control proceeds to the process 71. Otherwise, control proceeds to the process 134. In FIG. 14, OFFSET1 is specified for the offset 44 in the entry 58 (FIG. 9). Therefore, the conversion apparatus 24 performs the virtual-logical conversion process 71. After the process 71, the process 134 sends the access request to the storage identification information 43 in the entry enabled for reference. In FIG. 14, the storage device 26 is specified for the storage identification information 43 in the entry 58. Accordingly, the conversion apparatus 24 sends the access request to the storage device 26.

Figure 19:
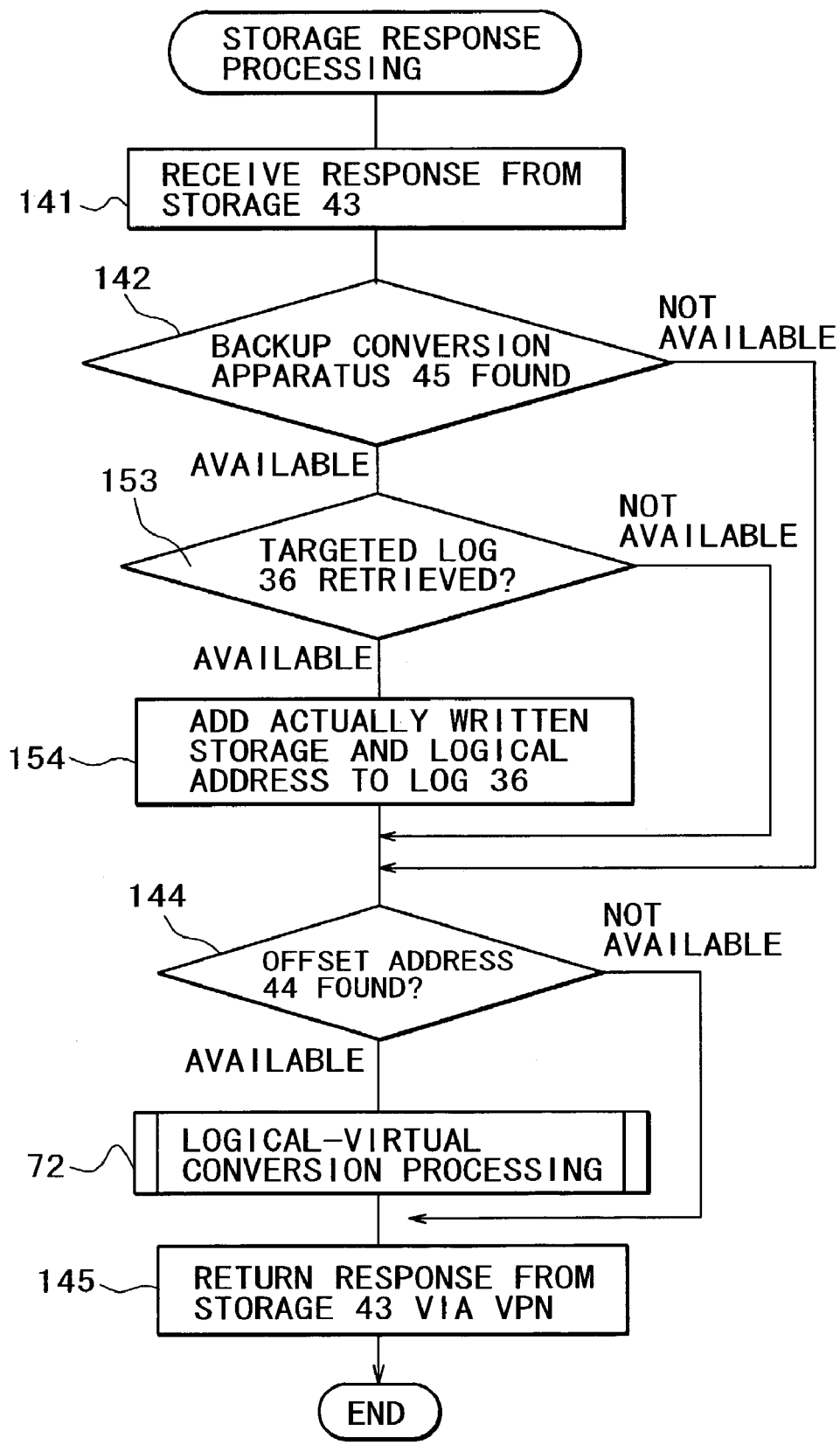
FIG. 19 is a flowchart showing a storage response process of the conversion apparatus according to the first preferred embodiment of the present invention.

FIG. 19 shows the detail of the storage response process 114 in FIG. 14. FIG. 19 shows a sequence of processes when the conversion apparatus 24 sends a write command to the storage device 26 and then receives a response from the storage device 26.

After writing data, the conversion apparatus performs the process 141 to await a response from the storage device. When a response is received from the storage device, control proceeds to the process 142. The process 142 determines whether or not the backup 45 is specified in the entry enabled for reference in FIG. 15. If the backup 45 is specified, control proceeds to the process 153. Otherwise, control proceeds to the process 144. In FIG. 14, the conversion apparatus 25 is specified for the backup 45 in the entry 58. Accordingly, the conversion apparatus 24 performs the process 153.

The process checks whether or not the write log table 39 (FIG. 17) contains the log 36 created from the access request during a write process to the storage device. If the log 36 is unavailable, it is assumed that the backup conversion apparatus already completes the write process. If the log 36 is available, control proceeds to the process 154 to append information actually written to the log 36. This information concerns the storage device and the logical address. In FIG. 14, the storage device 26 and the logical address 89 are appended to the log 36. A state 331 is updated to "after writing".

The process 154 changes the log 36 to the log 37. The process 144 determines whether or not the offset 44 is specified in the entry enabled for reference in FIG. 15. If the offset 44 is specified, control proceeds to the process 72. Otherwise, control proceeds to the process 145. In FIG. 14, OFFSET1 is specified for the offset 44 in the entry 58. Therefore, the conversion apparatus 24 performs the logical-virtual conversion process 72.

The process 145 sends a response from the storage device to the source that issued the access request. In FIG. 14, the client 21 is an access source. Therefore, a response from the storage device 26 is sent to the client 21 via the VPN 51. The client 21 receives the response from the conversion apparatus 24 (process 213 in FIG. 5) to complete the write process.

Figure 20:
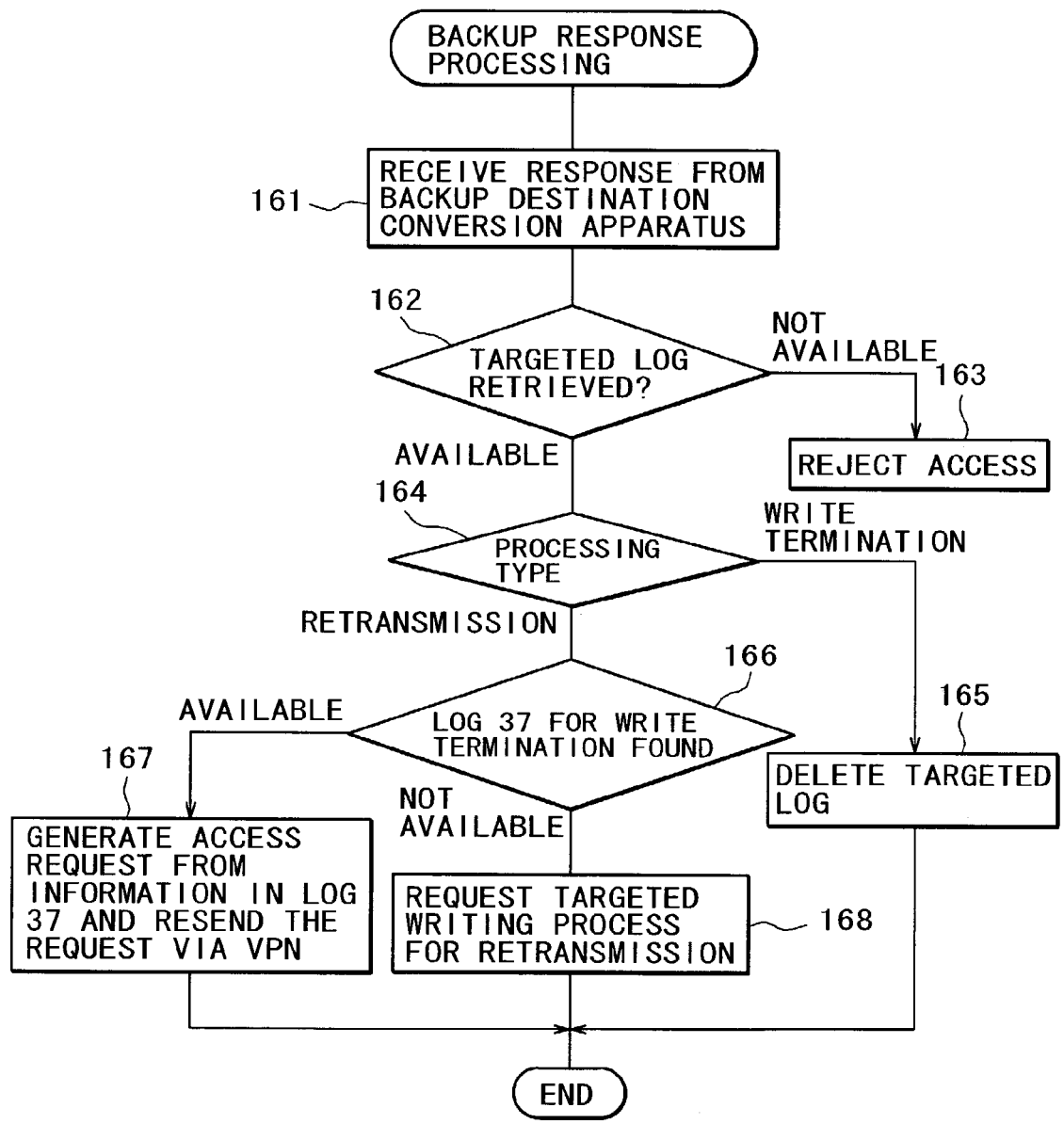
FIG. 20 is a flowchart showing a backup response process of the conversion apparatus according to the first preferred embodiment of the present invention.

FIG. 20 shows a detailed flowchart of the backup response process 116 in FIG. 14. FIG. 20 shows a sequence of processes for processing a response from the conversion apparatus as a backup destination.

The process 161 processes a response from the backup destination conversion apparatus. When receiving the response, control proceeds to the process 162. The process 162 retrieves the relevant logs 36 and 37 (see FIG. 17) based on the access request, the backup destination conversion apparatus 45, and the VPN identifier 41. When no log is available, the process notifies the backup destination conversion apparatus that no access request has been sent. Control then proceeds to the process 163. When the log is found, control proceeds to a process 164.

The process 164 determines the process content of the access request. When the process content indicates termination of the writing, control proceeds to the process 165 to delete the relevant log and terminate the backup response process 116.

When the process content indicates retransmission, control proceeds to the process 166. The process 166 determines the log type. When the log type corresponds to the "after-writing" state (e.g., log 37) indicating that the actually written storage information is appended to terminate the writing, control proceeds to the process 167. When the log type corresponds to the "beforewriting" state (e.g., log 36), control proceeds to the process 168. The process 167 generates the access request from the information in the log 37 and retransmits it to the backup destination conversion apparatus.

During the process 168, the conversion apparatus activates a process having the access request converted to the logical address from the virtual address in order to write the relevant access request to an actual storage. Hence, the conversion apparatus deletes the relevant log 36, converts the logical address of the header in the retained access request to a virtual address, then allows the corresponding process to reexecute a backup start process 132.

During the process 214 in FIG. 14, a response from the conversion apparatus 25 is sent upon completion of the writing to the storage device 26. Accordingly, the log 37 is generated upon completion of the writing, and then the backup response process is activated. The backup response process 116 deletes the log 37. According to the backup process management based on the write log table 39, the logs 36 and 37 are retained and the data synchronization is ensured until the backup destination conversion apparatus issues a response indicating termination of the writing. Accordingly, it just needs to return the response once to the client 21 when the conversion apparatus 24 terminates the write process. The response from the conversion apparatus 25 stops at the conversion apparatus 24 and is not returned to the client 21. It is also possible to keep a log undeleted. In this case, the value of the log state 331 is set to "complete" when the relevant log is deleted.

Figure 21:
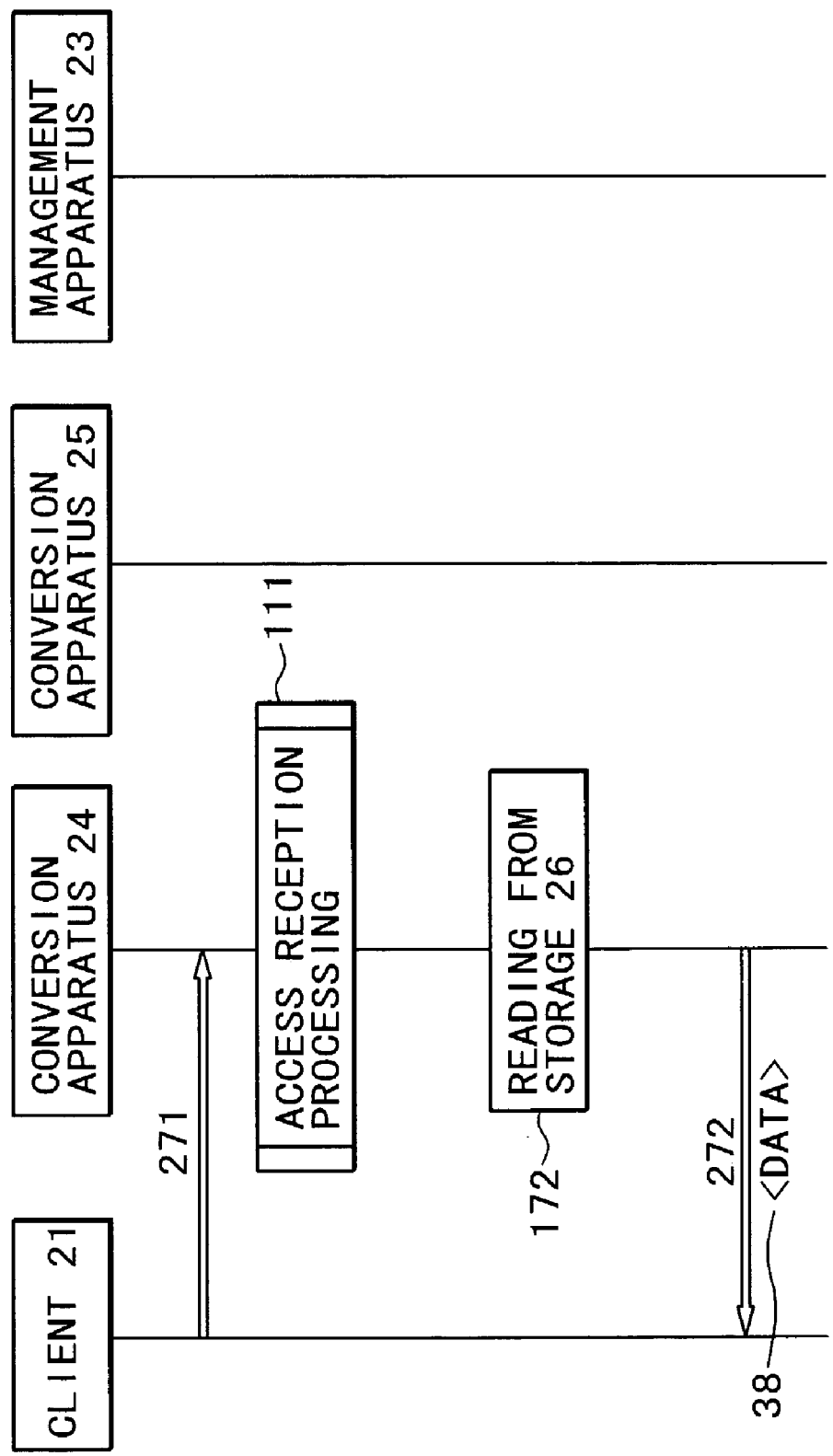
FIG. 21 is a sequence diagram showing a read process of the client from a virtual volume according to the first preferred embodiment of the present invention.

FIG. 21 shows a sequence of reading data from the virtual volume 16 of the client 21.

When reading data from the virtual volume 16, the client 21 sends an access request including the read command to the conversion apparatus 24 via the VPN 51 specified by VPN-ID31 (process 271). The conversion apparatus 24 checks if the conversion table 40 (FIG. 9) contains an entry having VPN-ID31 for the VPN identifier 41 (process 111). The conversion apparatus 24 references the specified entry 58 and reads data from the storage device 26 (process 172). When receiving a read termination response including the data 38 from the storage device 26, the conversion apparatus 24 returns the response to the client 21 (process 272) to complete the read process from the client 21.

The process 111 in FIG. 21 is the access reception process in FIG. 15. Since FIG. 21 shows the client's process to read data, the access reception process 111 is followed by the data read process 172.

Figure 22:
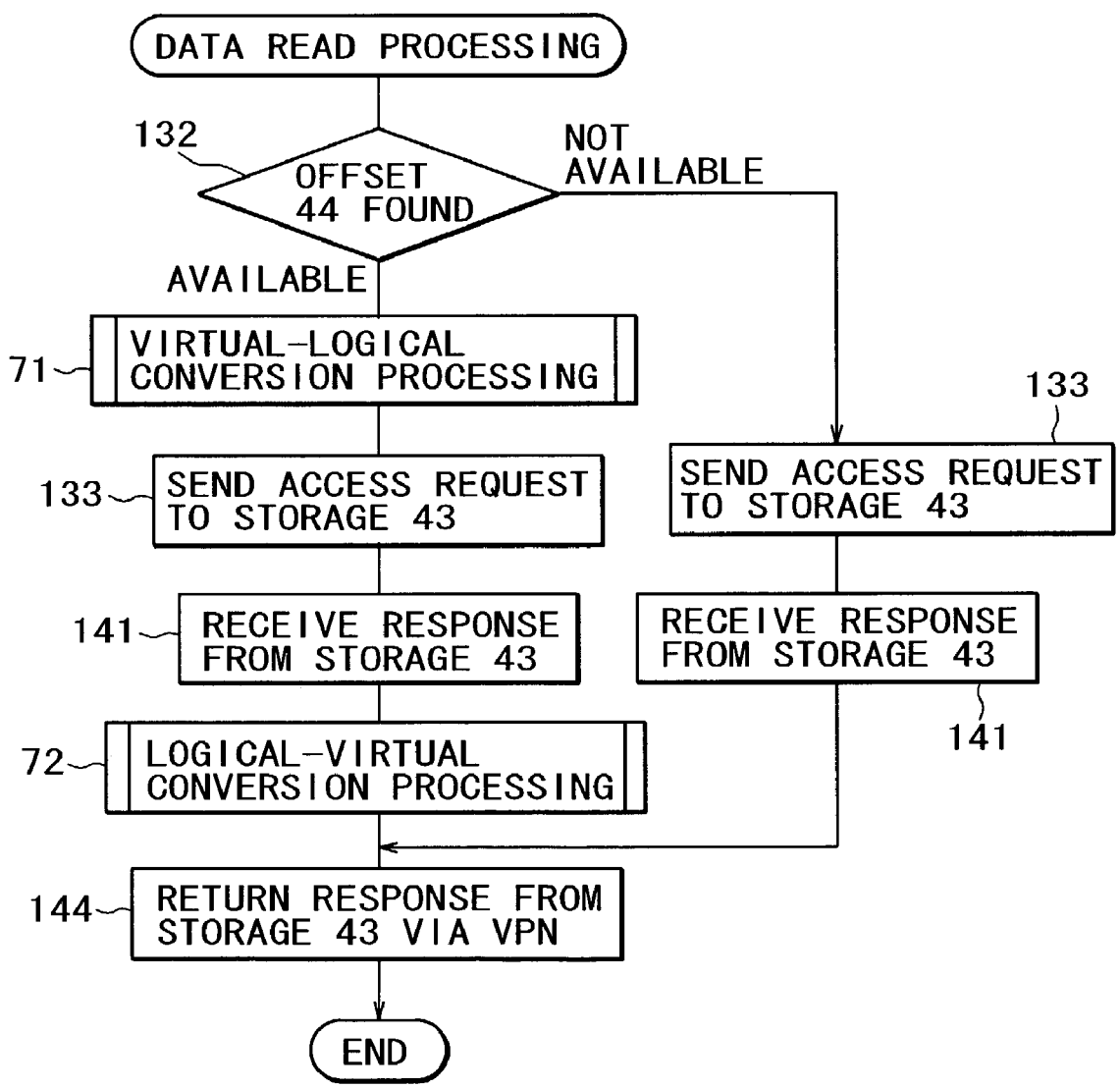
FIG. 22 is a flowchart showing a data read process of the conversion apparatus according to the first preferred embodiment of the present invention.

FIG. 22 shows a detailed flowchart of the data read process (process 172 in FIG. 21) from a storage device connected to the conversion apparatus.

The process 132 determines whether or not the offset 44 (FIG. 9) is specified in the entry enabled for reference in FIG. 15. If the offset 44 is specified, control proceeds to the process 71. Otherwise, control proceeds to the process 133. In FIG. 21, OFFSET1 is specified for the offset 44 in the entry 58. Therefore, the conversion apparatus 24 performs the virtual-logical conversion process 71.

After the process 71, the conversion apparatus 24 performs the process 133 to send an access request to the storage identification information 43 in the entry enabled for reference in FIG. 15. In FIG. 21, the storage device 26 is specified for the storage identification information 43 in the entry 58. Then, the conversion apparatus 24 sends the access request to the storage device 26. The process 141 receives a response from the storage device 26. The conversion apparatus 24 uses the process 72 to perform the logical-virtual conversion. The process 144 returns the access request including the data 38 to the client 21.

When the process 132 determines that the offset address 44 is not specified, the conversion apparatus transfers the access request to the storage device 26 without converting the address. To stop using the virtual volume, the client 21 sends VPN-ID31 and the client authentication information 33 to the management apparatus 23. The management apparatus 23 deletes the entry including VPN-ID31 in the conversion table from the conversion apparatuses 24 and 25, and then releases the VPN 51 for the client 21.

Figure 23:
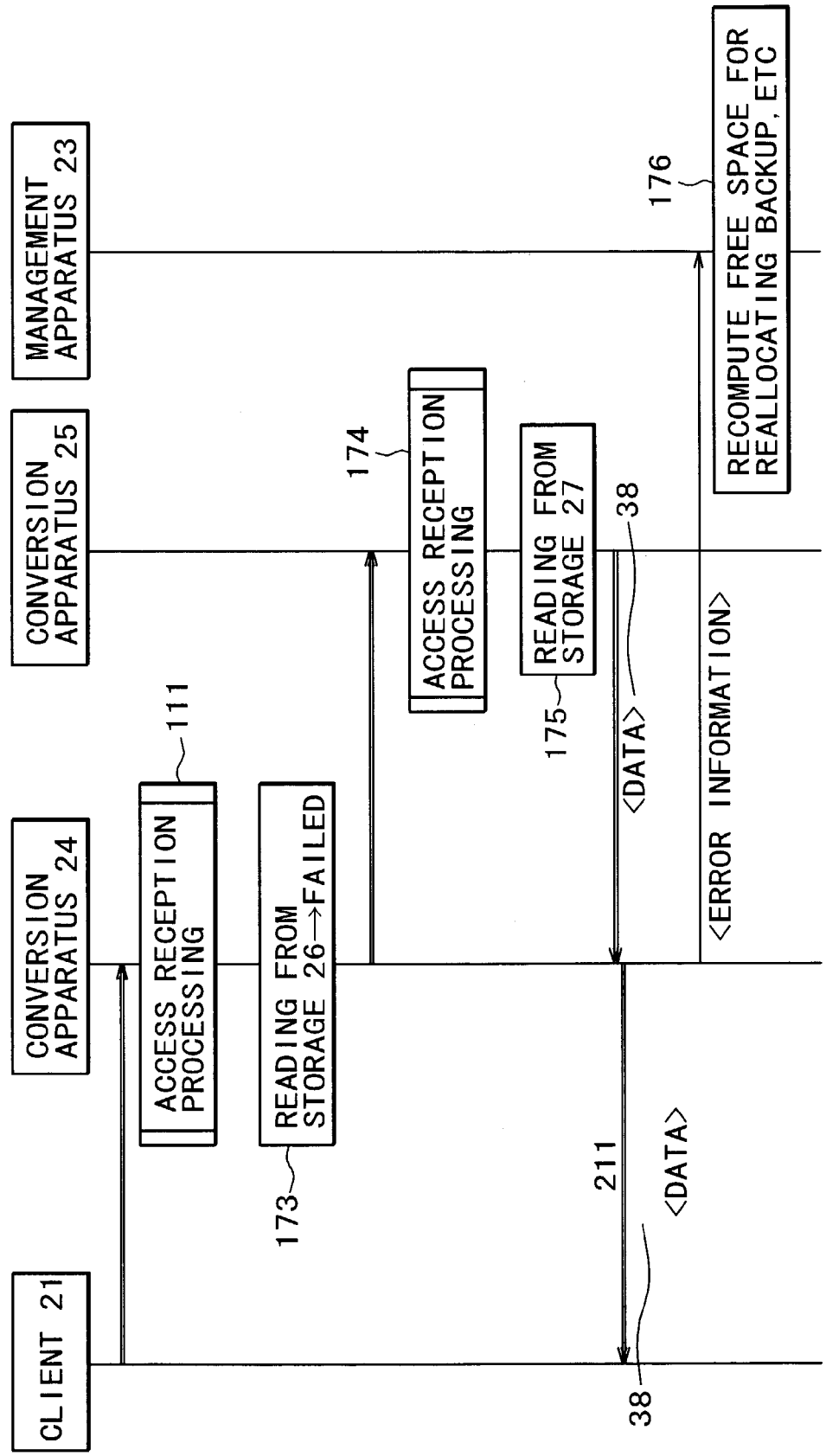
FIG. 23 is a sequence diagram showing a process for dealing with errors according to the first preferred embodiment of the present invention.

FIG. 23 shows a sequence diagram when the storage device 26 causes an error during a data read process from the virtual volume 16 of the client 21.

When reading data from the virtual volume 16, the client 21 sends a read command to the conversion apparatus 24 via the VPN 51 (process 271). The conversion apparatus 24 checks for an entry in the conversion table 40 (FIG. 9) (process 111), references the specified entry 58, and reads data from the storage device 26. When receiving no response or an unsuccessful response from the storage device 26, the conversion apparatus 24 determines that an error occurs in the storage device 26 (process 173).

When an error occurs in the storage device 26 and the read operation fails, the conversion apparatus 24 converts the logical address in the header of the access request to the virtual address, and then sends this access request to the conversion apparatus 25 (process 273). Like the conversion apparatus 24, the conversion apparatus 25 checks the conversion table 49 for an entry (process 174). The conversion apparatus 25 references the entry 59 and reads data from the storage device 27 to receive the data 38 (process 175). The conversion apparatus 25 transfers the response including the data 38 from the storage device to the conversion apparatus 24 (process 274).

The conversion apparatus 24 sends the response received from the storage device via the conversion apparatus 25 to the client 21 (process 272). After the client completes the read process, the conversion apparatus 24 sends error information to the management apparatus 23 (process 275).

The management apparatus 23 allocates a new backup destination or a different virtual volume to prepare for a data read or write command from the client 21 (process 176). When a different virtual volume is allocated, the management apparatus 23 retains the write log 37 until the original storage device recovers. When the original storage device recovers, the management apparatus 23 resumes the most recent state for synchronization based on the log 37 from the different virtual volume. This sequence of operations enables synchronization of the write data even if an error occurs.

It is assumed that the VPN types include MPLS-VPN, IP-VPN, IPsec-based VPN, and SVC (Switched Virtual Circuit) when ATM is used for VPN. It is assumed that means for setting a VPN include the policy distribution such as COPS (Common Open Policy Service) and operator's operations. MPLS is described in "Multiprotocol Label Switching Architecture" (RFC3031) published by IETF. MPLS-VPN is described in "BGP/MPLS VPNs" (RFC2547) published by IETF. COPS is described in "The COPS (Common Open Policy Service) Protocol" (RFC2748) and "COPS Usage for Policy Provisioning (COPS-PR)" (RFC3084) published by IETF.

A first preferred embodiment of the present invention having the above-mentioned configuration comprises a client or a network node having the VPN capability; a storage device comprising an SAN etc.; a management apparatus having a means for managing the storage capacity and a logical volume allocated to the storage device; a protocol conversion means for converting a protocol such as SAN used for the storage device to a protocol used in a LAN/MAN/WAN and vice versa; and a conversion apparatus having the VPN capability. As security countermeasures, a mapping means is provided to specify one or more types of VPNs between the client and the conversion apparatus, maintain a mapping between the conversion apparatus and the storage device according to the zoning capability, and supply the conversion apparatus with a mapping between the VPN and the storage access range. Since the VPN is only established between the conversion apparatus and a client having the valid access privilege for the storage device, identifying the VPN can identify the client. The VPN-ID is used to identify the VPN. An address in the logical volume is used to specify the storage access range. Consequently, it is possible to simultaneously prevent unauthorized access and ensure the volume management scalability.

Namely, a VPN is provided between the client and the conversion apparatus but is not provided for the storage device. An SAN is provided between the conversion apparatus and the storage device but cannot directly communicate with a client connected to the LAN/MAN/WAN. Accordingly, the conversion apparatus must always be used for communication with the client. The conversion apparatus rejects access to the storage device from a client whose conversion apparatus is not provided with the VPN ID, ensuring the security from the conversion apparatus to the storage side. Further, since the VPN-ID is used to provide a mapping means between the VPN and the storage access range, it is possible to not only limit accesses to the storage device, but also manage the storage access range. Consequently, it is possible to increase the number of volumes allocated to the client compared to the volume monitoring restricted by the number of ports in the SAN. This makes it possible to prevent unauthorized access or wiretapping. In addition, the volume management scalability can be improved by dividing the logical volume into portions and allocating them to a plurality of clients. Moreover, the conversion apparatus 24 is specified as an original. The conversion apparatus 25 is specified as a backup. When an error occurs on the storage device 26 for the original, the management apparatus 23 can detect that error. The storage device 27 for the backup can save data subject to the error.

Figure 24:
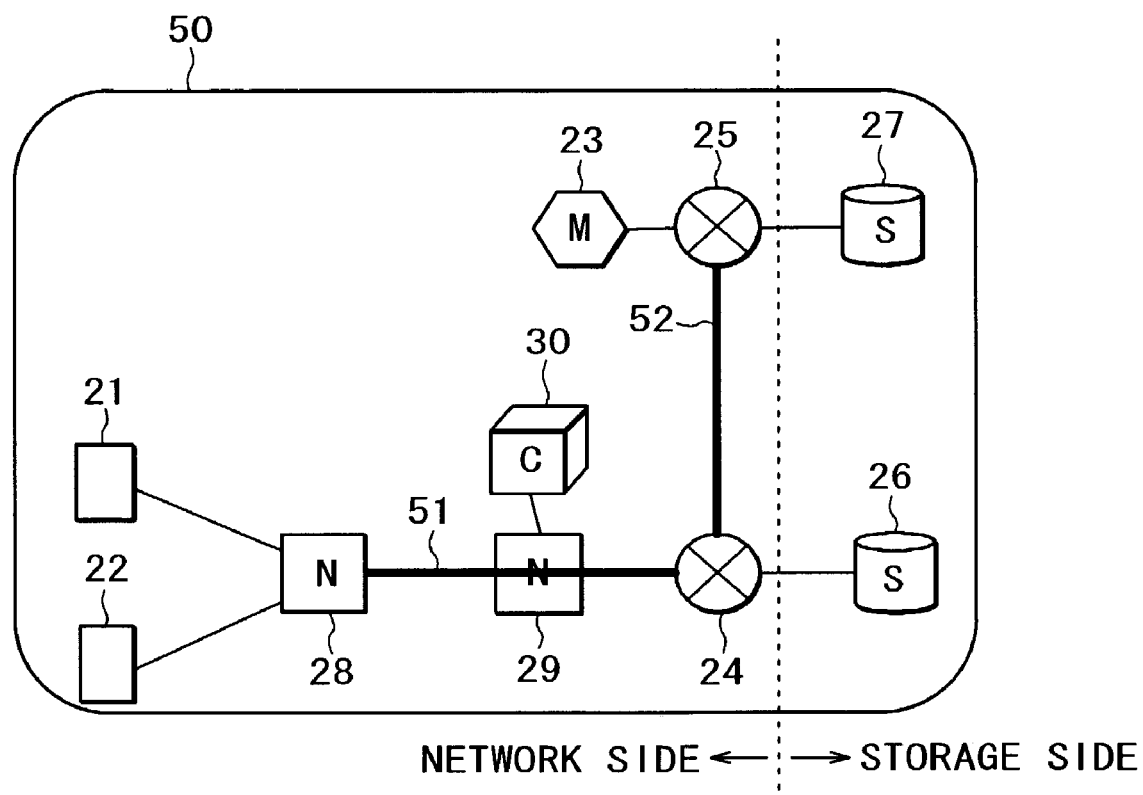
FIG. 24 shows a network configuration according to a second preferred embodiment of the present invention.
Figure 27:
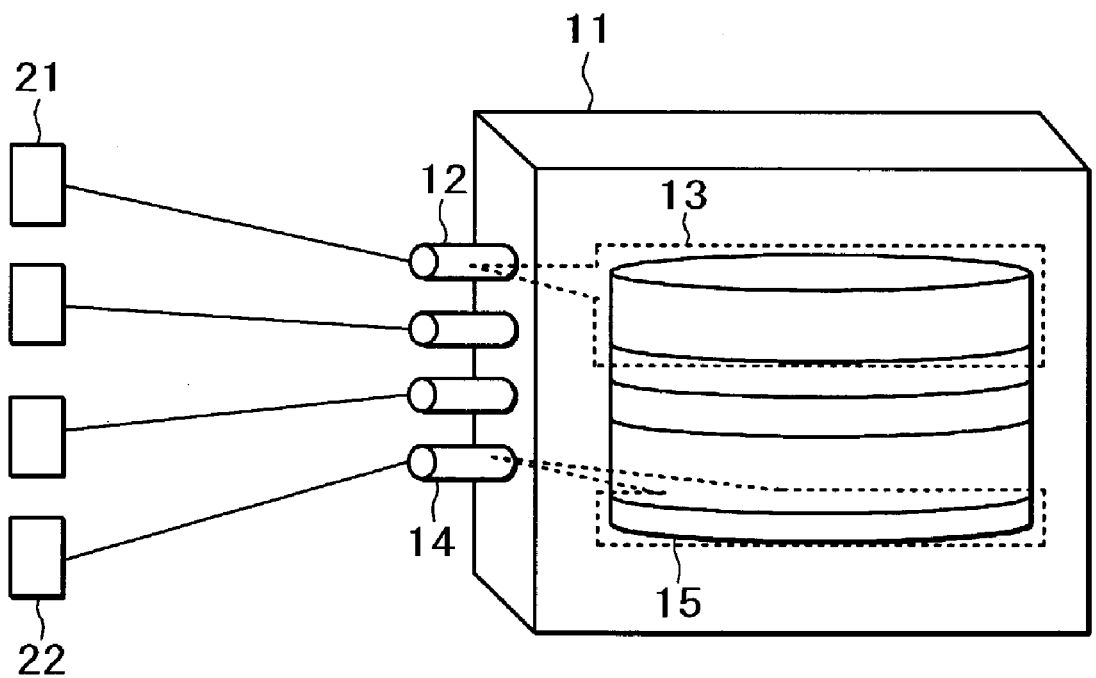
FIG. 27 is an explanatory diagram showing volume management using FC ports according to the prior art.

FIG. 24 shows a preferred storage system according to a second embodiment of the present invention. The reference numerals 21 and 22 represent the clients, 23 the management apparatus, 24 and 25 the conversion apparatuses, 26 and 27 the storage devices, 28 and 29 network nodes, and 30 a network controller. The network nodes 28 and 29 are called routers or switches and should be capable of setting a VPN. The network controller 30 specifies a VPN for the conversion apparatuses 24 and 25 or the network nodes 28 and 29. The network controller 30 provides traffic having VPN-ID31 with the communication quality (VPN traffic, QoS priority setting, etc.) and a redundant configuration. The clients 21 and 22 need not be provided with a means for setting a VPN. The reference numeral 50 denotes a network. The network is supplied with traffic that may be an obstacle to access from the client to the storage device. The network controller 30 provides the network with communication quality setting such as ensuring a bandwidth.

The conversion apparatus 24 connects with the conversion apparatus 25, the storage device 26, and the network node 29. The network protocol is used to connect the conversion apparatus 24, the conversion apparatus 25, and the network node 29. The FC protocol is used to connect the conversion apparatus 24 and the storage device 26. The network node 29 connects with the network node 28 and the network controller 30 by means of the network protocol. The network node 28 connects with the clients 21 and 22 by means of the network protocol. The conversion apparatus 25 connects with the management apparatus 23 and the storage device 27. The network protocol is used to connect the conversion apparatus 25 and the management apparatus 23. The FC protocol is used to connect the conversion apparatus 25 and the storage device 27.

The network controller 30 can specify a VPN between the network nodes 28 and 29, between the network node 29 and the conversion apparatus 24, and between the conversion apparatuses 24 and 25. The network controller 30 can provide the network node 28 with the client information and a mapping to the VPN.

In the storage system according to the second preferred embodiment, like the storage system according to the first preferred embodiment, the client 21 sends the client authentication information 33 to the management apparatus 23 in order to perform a procedure to use a virtual volume allocated on the network. Upon successful authentication of the client 21, the management apparatus 23 determines VPN-ID31 for the client 21. Like the first preferred embodiment, the management apparatus 23 assigns the entries 58 and 59 in the conversion table 40 and the client information 34 to the conversion apparatuses 24 and 25. The management apparatus 23 sends the client information 34 for the client 21 and VPN-ID31 to the network controller 30. The management apparatus 23 sends the VPN-ID31 and the address of the conversion apparatus 24 to the client 21.

The network controller 30 specifies the VPN 51 according to VPN-ID31 between the network nodes 28 and 29 and the conversion apparatus 24. The network controller 30 specifies the VPN 52 between the conversion apparatuses 24 and 25. The network controller 30 assigns the client 21 the traffic according to the client information for the client 21 and a mapping to the VPN 51 for the client 21. The remaining processes are the same as those for the first preferred embodiment.

From the viewpoint of security, the second preferred embodiment seems to cause a problem because the VPN 51 is not provided between the client 21 and the network node 28. However, the security is ensured because the network node 28 identifies the client 21 and distinguishes it from the other traffic.

The second preferred embodiment ensures bandwidths and communication paths using MPLS (Multiprotocol Label Switching) or extended MPLS protocols, the GMPLS (Generalized MPLS) signaling, the policy routing, Diffserv, RSVP (Resource Reservation Protocol), and VP (Virtual Path)/VC (Virtual Channel) settings in the ATM (Asynchronous Transfer Mode) The GMPLS signaling is described in the "Generalized MPLS—Signaling Functional Description" (draft-ietf-mpls-generalized-signaling) published by IETF.

When a network managing server is already provided with the interface between the network controller 30 and the management apparatus 23 and any VPN-ID can be used to specify a VPN, a setup means for that server is used. When the network controller 30 has no external setup means, the VPN is predetermined. Entries in the conversion table corresponding to the conversion apparatus are specified so that the VPN becomes effective when a usage procedure from the client is processed.

In addition to the effects of the first preferred embodiment, the secure storage system according to the second preferred embodiment having the above-mentioned configuration provides the network node with the mapping between the client and the VPN. It is possible to ensure the security for access to the storage device even if the VPN cannot be directly specified for the client.

FIG. 25 shows a storage system according to a third preferred embodiment of the present invention. The network node 28 is equivalent to a switch and is capable of VLAN settings though the VPN capability is not provided. The network node 29 is equivalent to a router, has the VLAN and VPN capabilities, and is capable of mapping between the VLAN and the VPN. The components performing the same operations in the first and second preferred embodiments are depicted by the same reference numerals and a duplicate detailed description thereof is omitted for simplicity.

A VLAN makes a connection between the network nodes 28 and 29. A VPN makes a connection between the network node 29 and the conversion apparatus 24, and between the conversion apparatuses 24 and 25. The network controller 30 can assign the VPN to the network node 29, the conversion apparatuses 24 and 25; and the VLAN to the network nodes 28 and 29. In addition, the network controller 30 can assign the client information and a mapping to the VLAN to the network node 28; and the VLAN and a mapping to the VPN to the network node 29.

When receiving a request to specify the VPN 51 for the client 21 from the management apparatus 23, the network controller 30 provides the VPN 51 between the conversion apparatus 25 and the network node 29; VPN 52 between the conversion apparatus 24 and the conversion apparatus 25; and VLAN 53 between the network nodes 28 and 29. The network controller 30 determines and manages the VLAN 53 in correspondence with VPN-ID31 received from the management apparatus 23. The network node 28 is assigned with traffic according to the client information 34 for the client 21 and a mapping to the VLAN 53 for the client 21. The network node 29 is assigned with the VLAN 53 for the client 21 and a mapping to the VPN 51 for the client 21. The remaining processes are the same as those for the second preferred embodiment.

In addition to the effects of the first preferred embodiment, the secure storage system according to the third preferred embodiment having the above-mentioned configuration uses the VPN-ID for mapping between the VLAN and the VPN. It is possible to ensure the security for an access to the storage device from the client on the VLAN even if the VLAN is provided between the client and the network node.

FIG. 26 shows the storage system according to a fourth preferred embodiment of the present invention. The components performing the same operations in the first through third preferred embodiments are depicted by the same reference numerals and a duplicate detailed description thereof is omitted for simplicity.

The reference numerals 21 and 22 represent the clients, 24 and 25 the conversion apparatuses, 26 and 27 the storage devices, 23 the management apparatus, 30 the network controller, 28 the network node, 7 an internal network comprising the LAN or the SAN, and 8 an external network such as an MAN or a WAN. The VPN can be assigned to the conversion apparatuses 24 and 25, and the network node 28. One network controller 30 is provided in each of the internal network 7 and the external network 8. The network controller 30 enables or disables the VPNs 51 and 52 according to VPN-ID31 sent from the management apparatus 23, provides a mapping between the VLAN and the VPN, and specifies the VPN/VLAN based on the client information for the network node 28 and the conversion apparatuses 24 and 25 in each network.

In addition to the effects of the first preferred embodiment, the secure storage system according to the fourth embodiment having the above-mentioned configuration can ensure the security for an access to the storage device from the client on a large-scale network such as the MAN or WAN assigned with the VLAN.

The following describes a fifth preferred embodiment that is a modified example of the storage system according to the first preferred embodiment. In the storage system according to the fifth preferred embodiment, the conversion apparatus 24 is assigned to the backup conversion apparatus 45 in the entry 59 (FIG. 10) of the conversion table 49 for the conversion apparatus 25. The conversion apparatus 25 works as a backup apparatus for the conversion apparatus 24. The conversion apparatus 24 works as a backup for the conversion apparatus 25. The components performing the same operations in the first preferred embodiment are depicted by the same reference numerals and a duplicate detailed description thereof is omitted for simplicity.

Viewed from the conversion apparatus 25, the conversion apparatus 25 functions as a backup conversion apparatus. Like the original conversion apparatus 24, the conversion apparatus 25 can disperse loads by processing accesses from the other clients. The management apparatus 23 can return identification information about an appropriate conversion apparatus so that accesses from the client can be dispersed or an access rate can be increased during an authentication response from the client for the procedure to use virtual volumes.

In addition to the effects of the first preferred embodiment, the secure storage system according to the fifth preferred embodiment having the above-mentioned configuration can specify the conversion apparatus 25 as a backup for the conversion apparatus 24 and the conversion apparatus 24 as a backup for the conversion apparatus 25. Each conversion apparatus can share accesses and increase the access rate.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A storage system having a storage device and a client connected to a virtual private network ("VPN") using the storage device, the system comprising:
    a management apparatus that manages the storage device by means of a logical volume assigned to the storage device;
    a conversion apparatus that converts between a protocol corresponding to the storage device and a protocol used for the virtual private network; and
    a mapping means that stores a VPN identifier allocated to the client and an access address range in the logical volume of the storage device corresponding to the virtual private network.

2. The storage system according to claim 1, wherein the mapping means stores an entry specifying correspondence between the VPN identifier and identification information about the storage device having the logical volume and an access address range of the logical volume specified for the storage device.

3. The storage system according to claim 2, wherein the management apparatus assigns the client the logical volume specified for the storage device, the access address range in the logical volume, and the VPN identifier.

4. The storage system according to claim 2, wherein the management apparatus comprises:
    a virtual private network setup means for configuring a virtual private network between the client and the conversion apparatus by using the VPN identifier;
    a virtual private network management means for managing the conversion apparatus, the storage device, and the virtual private network; and
    an entry setup means for allowing the mapping means to store correspondence between a virtual private network allocated to the client and an access address range of the storage device for the virtual private network when the client uses the storage device.

5. The storage system according to claim 2, further comprising:
    a network controller to configure a virtual private network using the VPN identifier, wherein
    the management apparatus has a virtual private network setup request means for allowing the network controller to configure a virtual private network using the VPN identifier; and
    the network controller configures the virtual private network over a plurality of networks according to a request from the virtual private network setup request means.

6. The storage system according to claim 2, wherein the network controller sets communication quality for traffic having the VPN identifier and ensures communication quality of the virtual private network.

7. The storage system according to claim 5, further comprising:
    a network node having a network correspondence means for making correspondence between a virtual network assigned to a network and the virtual private network, wherein
    the network controller comprises a virtual network management means for managing correspondence between the virtual private network and a virtual network.

8. The storage system according to claim 2, wherein
    the client connects to the conversion apparatus via the virtual private network by using identification information about the conversion apparatus and the VPN identifier, both sent from the management apparatus; and
    the management apparatus makes connection from the client to the storage device based on a result of authentication about the client by using the virtual private network.

9. The storage system according to claim 1, further comprising:
    a backup storage device that temporarily stores information stored in a logical volume specified for the storage device; and
    a backup conversion apparatus that converts a protocol for the backup storage device and a protocol used for the virtual private network, wherein
    the management apparatus comprises a backup entry setup means for storing identification information about the backup conversion apparatus in the mapping means when the client uses the logical volume.

10. The storage system according to claim 9, wherein the conversion apparatus comprises a data transfer means for transferring data to the backup storage device from the backup conversion apparatus when an error occurs in the storage device.

11. The storage system according to claim 1, wherein
    the management apparatus includes a virtual volume generation means for generating a virtual volume comprising one or more logical volumes;
    the mapping means stores an offset address for converting an address of the virtual volume to an address of the logical volume;
    the conversion apparatus includes an address conversion means for converting an address of the virtual volume to an address of the logical volume; and
    the address conversion means allocates the virtual volume to an unused area in the storage device.

12. A conversion apparatus connected to a storage device, wherein
    the conversion apparatus is connected to a client using the storage device via a virtual private network ("VPN"), wherein the conversion apparatus comprises:
    a protocol conversion means for converting between a protocol corresponding to the storage device and a protocol used for the virtual private network; and a mapping means that stores a VPN identifier allocated to the client and an access address range in the logical volume of the storage device corresponding to the virtual private network.

13. The conversion apparatus according to claim 12, wherein the mapping means stores an entry specifying correspondence between the VPN identifier and identification information about the storage device having the logical volume and an access address range of the logical volume specified for the storage device.

14. The conversion apparatus according to claim 12, wherein
the conversion apparatus is connected to a backup conversion apparatus that converts a protocol for a backup storage device to temporarily store information stored in a logical volume specified for the storage device and a protocol used for the virtual private network; and
the conversion apparatus includes a data transfer means for transferring data to the storage device from the backup conversion apparatus when an error occurs in the storage device.

15. A storage system comprising a storage device, a client connected to a virtual private network ("VPN"), a management apparatus that manages the storage device by means of a logical volume assigned to the storage device, a mapping means that stores a VPN identifier allocated to the client and an access address range in the logical volume of the storage device corresponding to the virtual private network, a conversion apparatus that is connected to the client via the virtual private network and converts between a protocol for the storage device and a protocol used for the virtual private network, and the mapping means that stores the VPN identifier allocated to the client and the access address range in the logical volume of the storage device corresponding to the virtual private network, wherein
the conversion apparatus, upon reception of an access request from the client via the virtual private network, writes data to the storage device connected to the conversion apparatus based on a check result of the VPN identifier; and
the conversion apparatus, upon reception of a response for write termination from the storage device, returns the response for write termination to the client to terminate a process to write data from the client.

16. A storage system comprising a storage device, a client connected to a virtual private network ("VPN"), a management apparatus that manages the storage device by means of a logical volume assigned to the storage device, a mapping means that stores a VPN identifier allocated to the client and an access address range in the logical volume of the storage device corresponding to the virtual private network, a conversion apparatus that is connected to the client via the virtual private network and converts between a protocol for the storage device and a protocol used for the virtual private network, and a backup conversion apparatus that is connected to the conversion apparatus and a backup storage device and that converts between a protocol for the backup storage device and a protocol used for the conversion apparatus, wherein
the conversion apparatus, upon reception of an access request from the client via the virtual private network, sends the access request to the backup conversion apparatus specified in a conversion table based on a first check result of the VPN identifier;
the conversion apparatus writes data to the storage device connected to the conversion apparatus;
the conversion apparatus, upon reception of a response for write termination from the storage device, returns the response for write termination to the client;
the backup conversion apparatus, upon reception of an access request from the conversion apparatus, writes data to the backup storage device connected to the backup conversion apparatus based on a second check result of the VPN identifier and, upon reception of a response for write termination from the backup storage device, returns the response for write termination to the conversion apparatus; and
the conversion apparatus, upon reception of a response from the backup conversion apparatus, terminates the process to write data from the client.

17. A storage system comprising a storage device, a client connected to a virtual private network ("VPN"), a management apparatus that manages the storage device by means of a logical volume assigned to the storage device, a mapping means that stores a VPN identifier allocated to the client and an access address range in the logical volume of the storage device corresponding to the virtual private network, a conversion apparatus that is connected to the client via the virtual private network and converts between a protocol for the storage device and a protocol used for the virtual private network, and a backup conversion apparatus that is connected to the conversion apparatus and a backup storage device and that converts between a protocol for the backup storage device and a protocol used for the conversion apparatus, wherein
the conversion apparatus, upon reception of an access request from the client via the virtual private network, sends a request to read data to the storage device connected to the conversion apparatus based on a first check result of the VPN identifier;
the conversion apparatus, upon unsuccessful reception of data from the storage device, sends an access request to the backup conversion apparatus connected to the conversion apparatus;
the backup conversion apparatus, upon reception of an access request from the conversion apparatus, reads data from the backup storage device connected to the backup conversion apparatus based on a second check result of the VPN identifier and, upon reception of data from the backup storage device, sends the data from the backup storage device to the conversion apparatus; and
the conversion apparatus, upon reception of data from the backup conversion apparatus, sends the data from the backup storage device to the client.

18. The storage system according to claim 17, wherein
the conversion apparatus, upon unsuccessful reception of data from the storage device, sends error information about the storage device to the management apparatus; and
the management apparatus changes a logical volume setting for the storage device.

19. The storage system according to claim 1, wherein said VPN identifier allocated to the client is used to prevent an unauthorized access from another client having no access privilege to said access address range.

20. The conversion apparatus according to claim 12, wherein said VPN identifier allocated to the client is used to prevent an unauthorized access from another client having no access privilege to said access address range.

* * * * *